Jan. 5, 1960     S. S. OTIS     2,919,851
AUTOMATIC CHECKING MACHINE

Filed Nov. 13, 1950     19 Sheets-Sheet 2

INVENTOR.
Samuel S. Otis
BY
Edwin Phelps
ATTORNEY

INVENTOR.
Samuel S. Otis
BY
Edwin Phelps
ATTORNEY

Jan. 5, 1960

S. S. OTIS 2,919,851

AUTOMATIC CHECKING MACHINE

Filed Nov. 13, 1950

INVENTOR.
Samuel S. Otis
BY
ATTORNEY

Jan. 5, 1960 S. S. OTIS 2,919,851
AUTOMATIC CHECKING MACHINE
Filed Nov. 13, 1950 19 Sheets-Sheet 5

INVENTOR.
Samuel S. Otis
BY
ATTORNEY

Jan. 5, 1960  S. S. OTIS  2,919,851
AUTOMATIC CHECKING MACHINE
Filed Nov. 13, 1950  19 Sheets-Sheet 6

INVENTOR.
Samuel S. Otis
BY
ATTORNEY

Jan. 5, 1960 S. S. OTIS 2,919,851
AUTOMATIC CHECKING MACHINE
Filed Nov. 13, 1950 19 Sheets-Sheet 7

INVENTOR.
Samuel S. Otis
BY
ATTORNEY

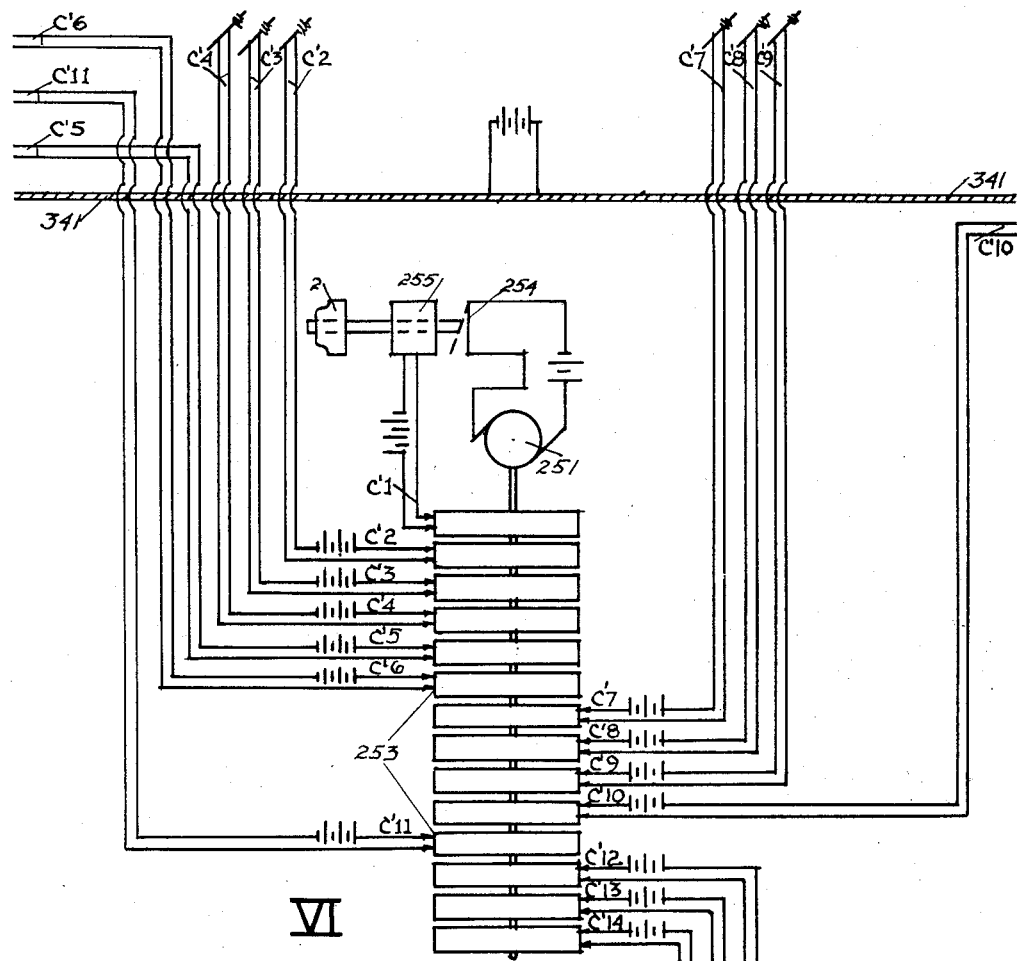
FIG. 16
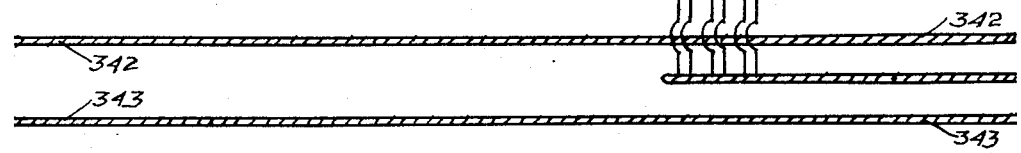

Jan. 5, 1960
S. S. OTIS
2,919,851
AUTOMATIC CHECKING MACHINE
Filed Nov. 13, 1950
19 Sheets-Sheet 10
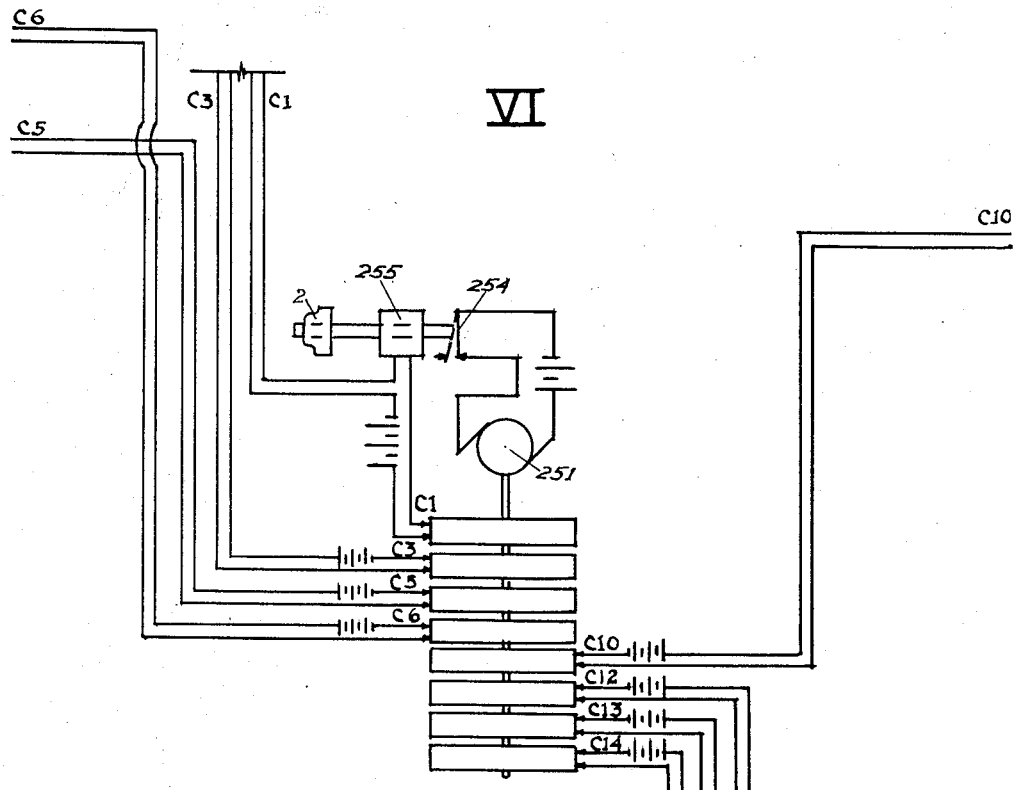
FIG.17
INVENTOR.
Samuel S. Otis
BY
ATTORNEY Jan. 5, 1960 S. S. OTIS 2,919,851
AUTOMATIC CHECKING MACHINE
Filed Nov. 13, 1950 19 Sheets-Sheet 11

INVENTOR.
Samuel S Otis
BY Erwin Phelps
ATTORNEY

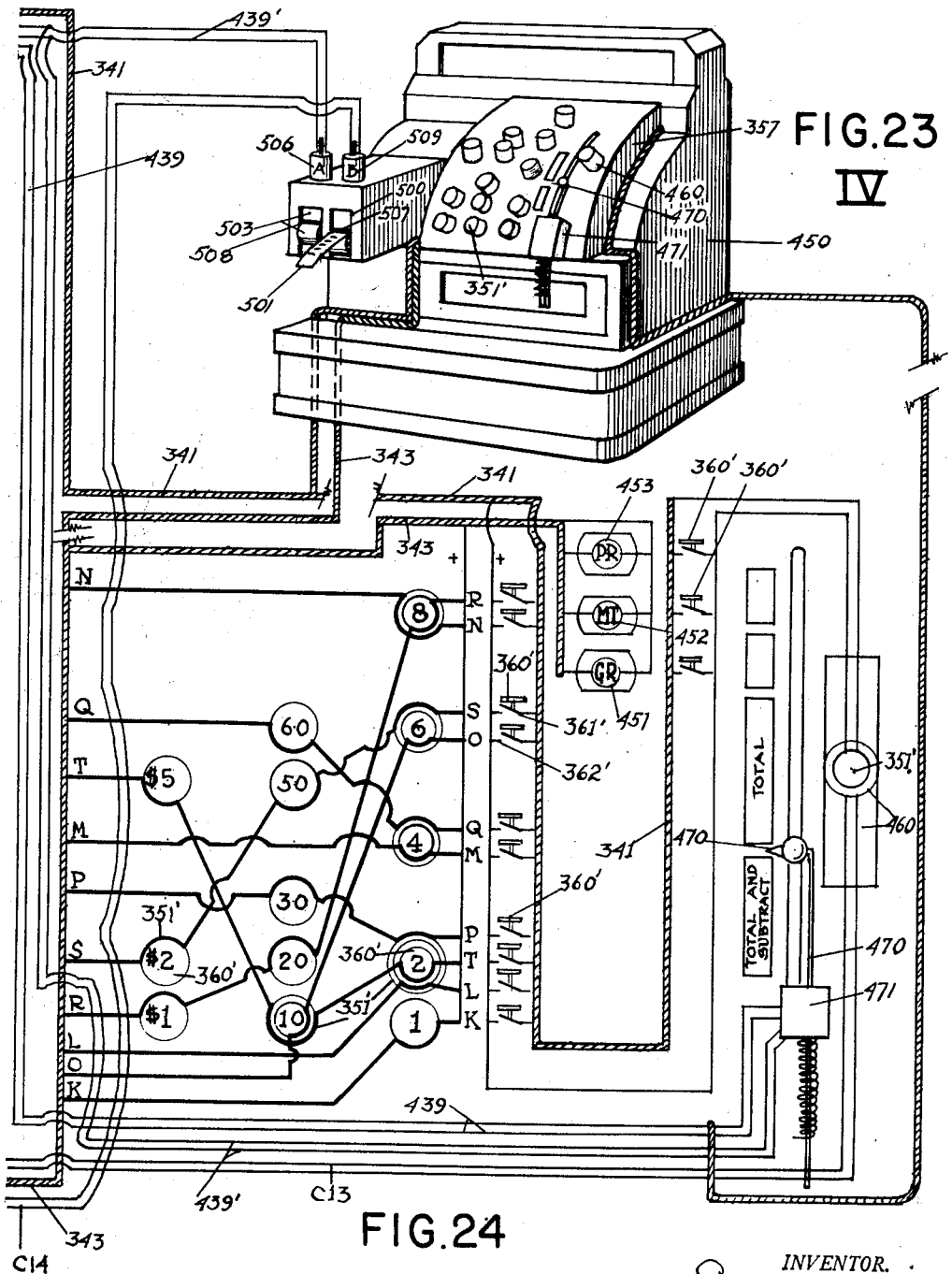

Jan. 5, 1960
S. S. OTIS
2,919,851
AUTOMATIC CHECKING MACHINE
Filed Nov. 13, 1950
19 Sheets-Sheet 15
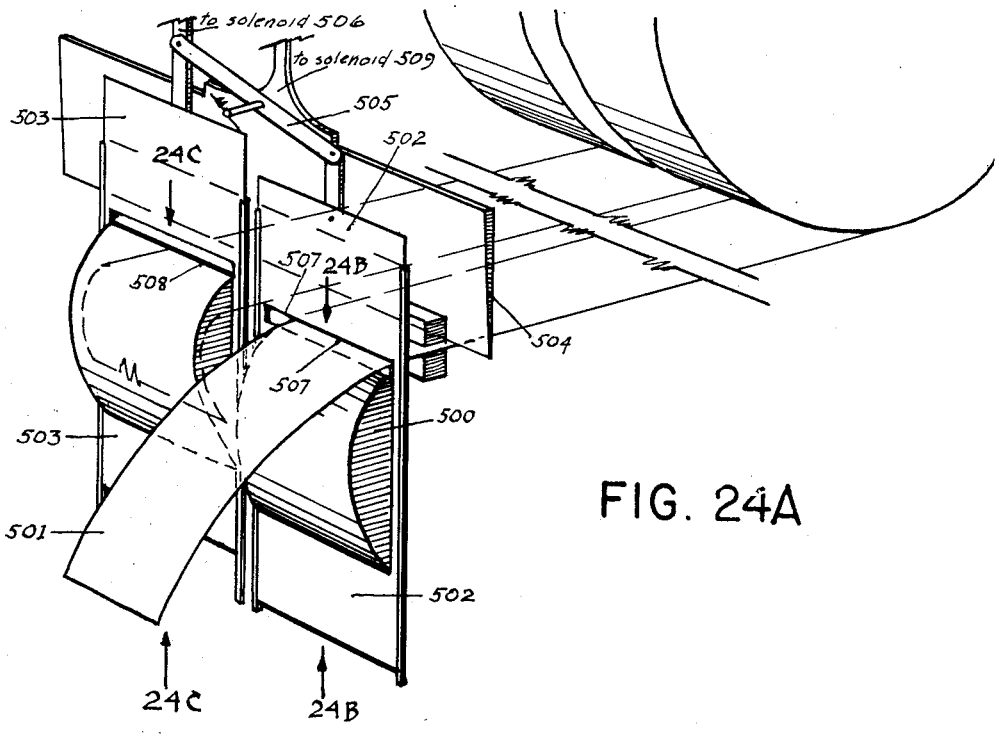
FIG. 24A
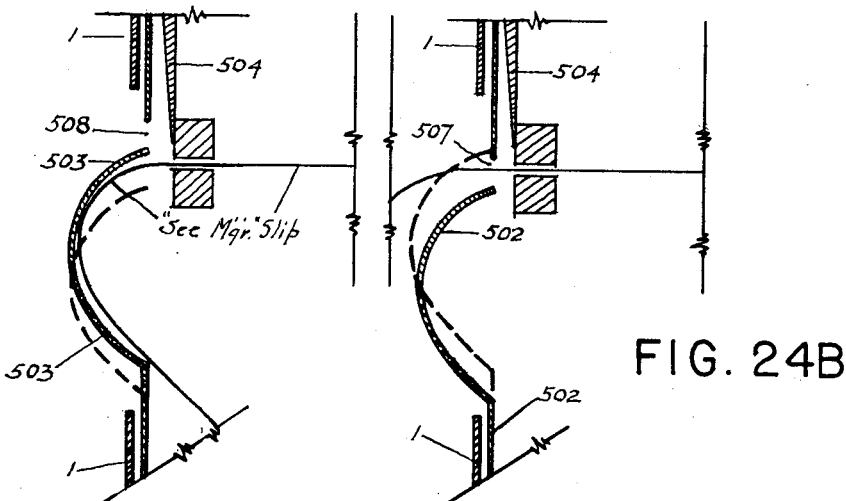
FIG. 24B
FIG. 24C
INVENTOR.
Samuel S. Otis
BY
ATTORNEY Jan. 5, 1960  S. S. OTIS  2,919,851
AUTOMATIC CHECKING MACHINE
Filed Nov. 13, 1950  19 Sheets-Sheet 16
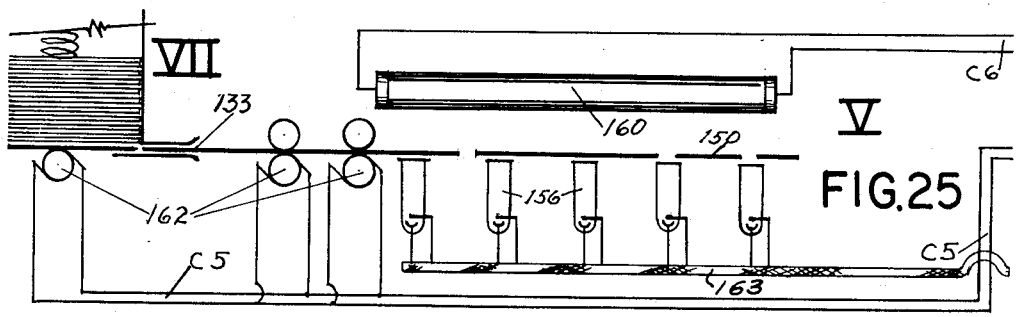
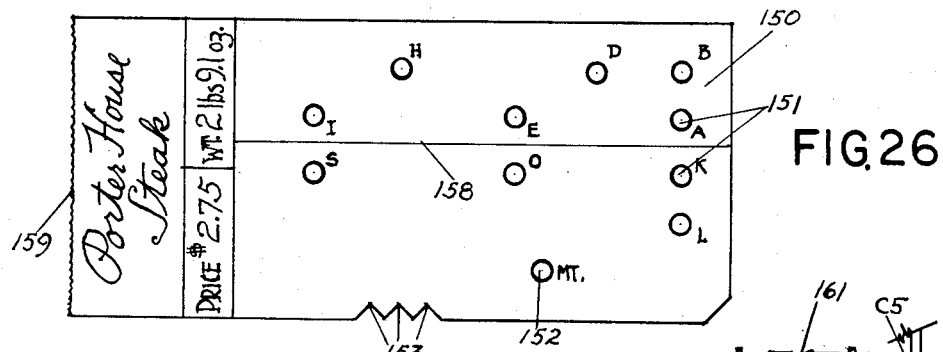
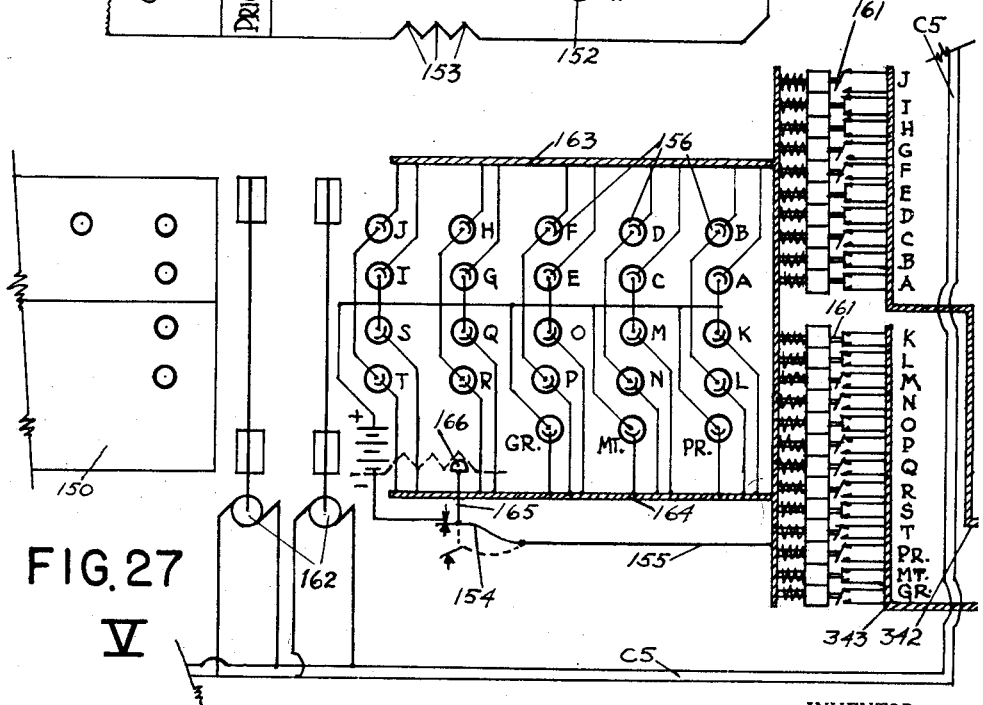
INVENTOR.
Samuel S. Otis
BY
ATTORNEY Jan. 5, 1960  S. S. OTIS  2,919,851
AUTOMATIC CHECKING MACHINE
Filed Nov. 13, 1950  19 Sheets-Sheet 17

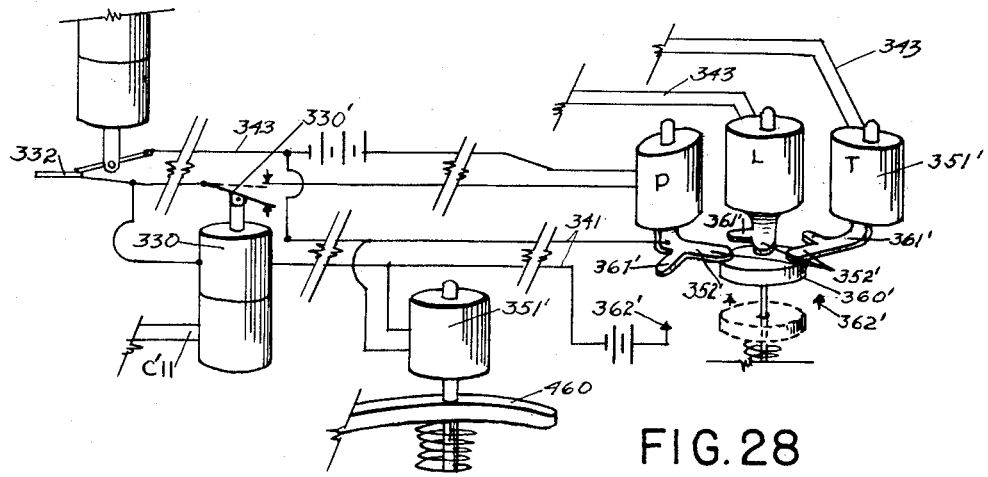

FIG. 28

| Seconds → | 1 | 2 | 3 | 4 | 5 | 6 | 7 | 8 | 9 | 10 | 11 | 12 | 13 | 14 | 15 | 16 | Circuit No. |
|---|---|---|---|---|---|---|---|---|---|---|---|---|---|---|---|---|---|
| Push button & Synchronizer reset. | | | | | | | | | | | | | | | | ▬ | C1 |
| Lead doors locked. | | ▬▬▬▬▬▬▬▬▬▬▬▬▬▬ | | | | | | | | | | | | | | | C2* |
| Scale platform unlatched. | | ▬▬▬▬▬▬▬▬▬▬▬▬▬▬ | | | | | | | | | | | | | | | C3 |
| X-Rays on. | | | ▬▬▬▬▬▬ | | | | | ▬▬▬▬▬ | | | | | | | | | C4* |
| Card feed motors on. | | ▬▬▬▬▬▬▬▬▬▬▬▬▬ | | | | | | | | | | | | | | | C5 |
| Sensing lamps on. | | ▬▬▬▬▬▬▬▬▬▬▬▬▬ | | | | | | | | | | | | | | | C6 |
| Shadow detectors on, — 1st & 2nd scannings | | | ▬▬▬▬▬ | | | | | ▬▬▬▬ | | | | | | | | | C7* |
| Turn & tilt motor—42. | | | | | | | | ▬ | | | | | | | | | C8* |
| Return of platform to normal. | | | | | | | | | | | | | | ▬ | | | C9* |
| Reset switch'd solenoids & clearing bar 365 (Wh Acc). | | | | | | | | | | | | | | | ▬▬ | | C10 |
| Reset solenoids 330, 301 306 etc. | | | | | | | | | | | | | | ▬ | | | C11* |
| Accord & Disaccord Switch 429. | | | | | | | | | | | | | | | ▬▬ | | C12 |
| Final Motor Bar Action. | | | | | | | | | | | | | | | ▬▬ | | C13 |
| Cutting Knife for slips at Cash Register. | | | | | | | | | | | | | | | | ▬ | C14 | end of complete cycle

\* Action pertains to trans-space machine primarily

FIG. 29

INVENTOR.
Samuel S. Otis
BY
ATTORNEY

Jan. 5, 1960  S. S. OTIS  2,919,851
AUTOMATIC CHECKING MACHINE
Filed Nov. 13, 1950  19 Sheets-Sheet 18

| SH.7 | SH.8 | SH.9 | SH.11 | SH.12 | SH.13 | SH.14 |
|---|---|---|---|---|---|---|
| FIG.13 | FIG.15 | FIG.16 | FIG.18 | FIG.21 | FIG.22 | FIG.23 |
| FIG.14 | | | FIG.19 | | | FIG.24 |
| | | | FIG.20 | | | |

| SH.16 | SH.10 | SH.11 | SH.12 | SH.13 | SH.14 |
|---|---|---|---|---|---|
| FIG.25 | FIG.17 | FIG.18 | FIG.21 | FIG.22 | FIG.23 |
| FIG.26 | | FIG.19 | | | |
| FIG.27 | | FIG.20 | | | FIG.24 |

INVENTOR.
Samuel S. Otis
BY
ATTORNEY

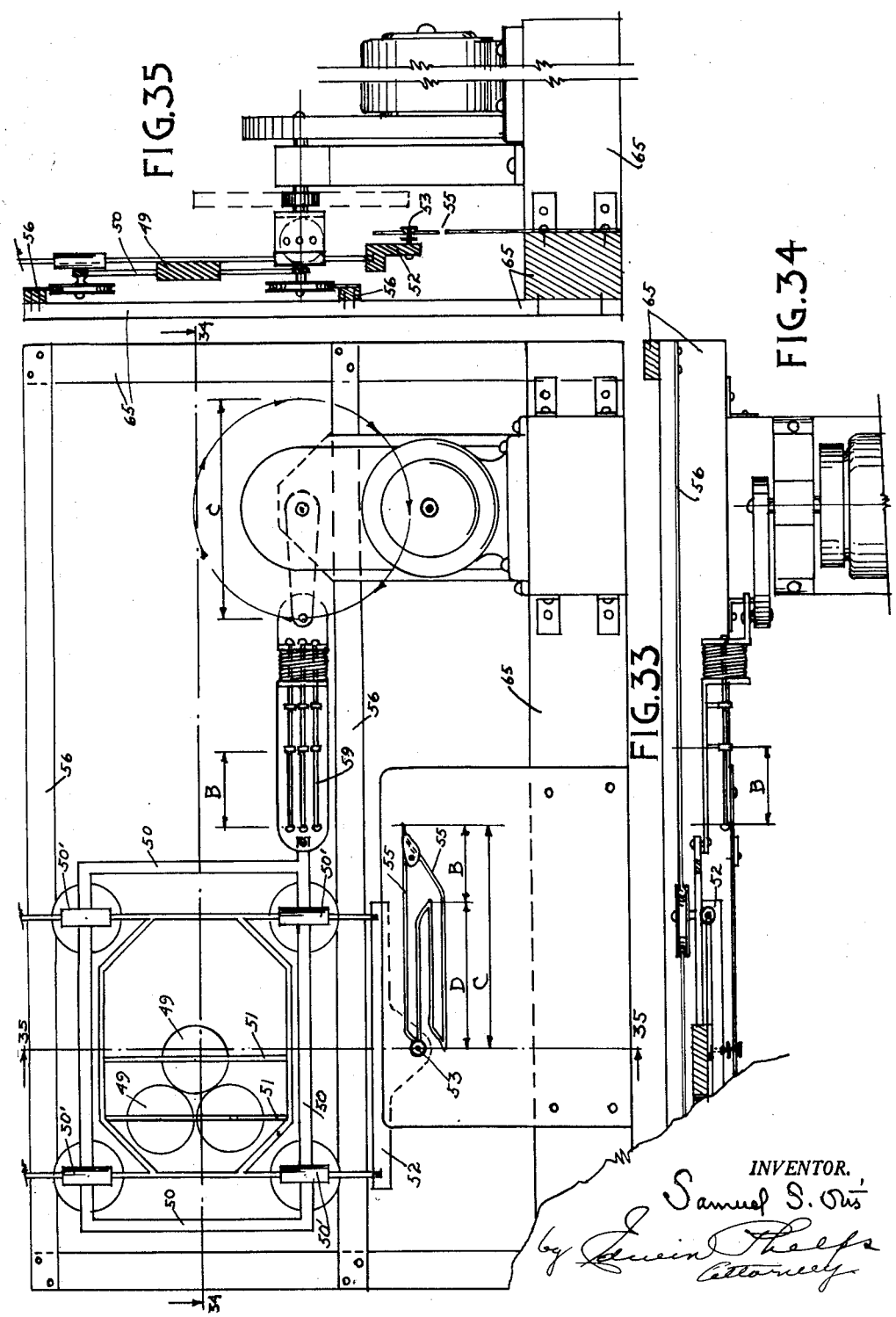

United States Patent Office 2,919,851
Patented Jan. 5, 1960

2,919,851

AUTOMATIC CHECKING MACHINE

Samuel S. Otis, Winnetka, Ill.

Application November 13, 1950, Serial No. 195,433

15 Claims. (Cl. 235—61.9)

This invention relates most immediately to a machine for automatically checking a miscellaneous collection of goods in a container and issuing a printed itemized and totalized sales check comparable to that presently issued by the standard cash register. This application is a continuation in part of copending application Ser. No. 144,-181, filed February 14, 1950, now abandoned.

Present practice in self-service stores is for the customer to select his goods from counters, open shelves, or bins, and places the goods in a container which he brings to a check-out counter. Here an employee unpacks the goods, notes the cost of each, which he successively enters on a cash register and from which, when properly activated after the listing of all the items, is issued an itemized and totalized check indicative of the cost of the goods thus selected by the customer. The amount of the check is paid by the customer, the goods are placed in another container, and the customer departs forthwith. All of this is time-consuming, expensive to the store and often irritating to the customer. The larger markets attempt to alleviate this situaion by employing several persons at each checkout station. This increases expense, and, all too often, does not materially eliminate the delays and inconveniences.

The main objects of this invention, therefore, are to provide an improved form of machine for automatically issuing a visual record of the individual and composite of at least one of two characteristics common to a selected number of goods indicia of which characteristics have been pre-arrangedly associated with each of said goods. To provide an improved machine of this kind wherein the indicia-activate means for effecting the issuance of such a recordation is either through the medium of some form of space-transmitted waves or by mechanical means; to provide an improved machine of this kind having means for registering the substantial accord or material discrepancy between the composite actual and composite indicated second characteristic common to said goods and thereby permit the issuance of the aforesaid visual record or require the issuance of a substitute therefor; to provide in one type of a machine of this kind a coordinated arrangement of X-ray and photo-electric cell mechanisms capable of activation by the indicia associated with the selected goods for effecting the visual recording process; to provide in another type of machine of this kind improved mechanical means capable of direct activation by the indicia associated with said goods for effecting the issuance of such a recordation; to provide an improved machine of this kind especially adapted for issuing a visual record of the individual and composite price characteristics for the various goods selected by a shopper from shelves, trays, and bins of a store or market; to provide an improved form and arrangement of parts of a machine of this kind whereby the issuance of the aforesaid visual record is dependent upon the substantial agreement between the composite actual and indicated weight of the goods in the container; to provide an improved machine of the space-transmitted wave type with means for automatically altering the initial position of the container of goods with respect to the wave-transmitting mechanism so as to insure a recordation of all the indicia on the goods in a container and the issuance of a visual price record representative of the full composite price characteristics of all of the goods in the container; to provide a machine of the space-transmitted wave type with means for mechanically recording each indicia-influenced action for each altered position of the container and eliminating duplicate records so that the visual-price record is representative of no more than but the full composite of all the goods in the container; and to provide an improved machine of this kind which permits the shopper to place the container of goods on the machine and initiate its operation independent of the services of the store attendant.

In the accompanying drawings, two embodiments of this invention are illustrated. One of these is hereinafter called the "mechanical" recording type machine, since it employs a mechanism, comparable to that presently used for making printed recordations from apertured or perforate cards, for the purpose of activating the accumulating and record-issuing mechanisms. The other is hereinafter designated as the "trans-space" recording type machine, since it employs space waves, such as might be obtained from light, sound, radiation, or the like, for activating the mechanisms for effecting the issuance of the sales check. The views are largely diagrammatic and in some instances fragmentary of a large and extended unit. However, they generally show as much of the structure as is essential to understanding its character and functioning.

2,919,851

3

Figure 7:
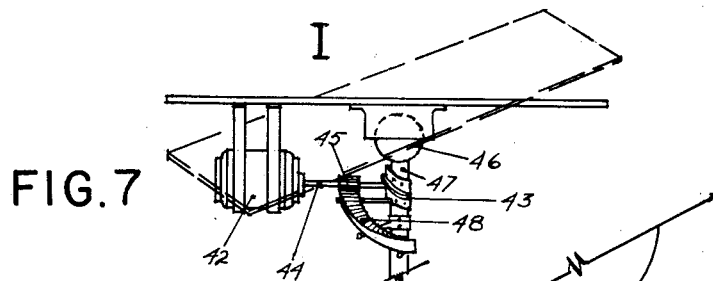
Figure 8:
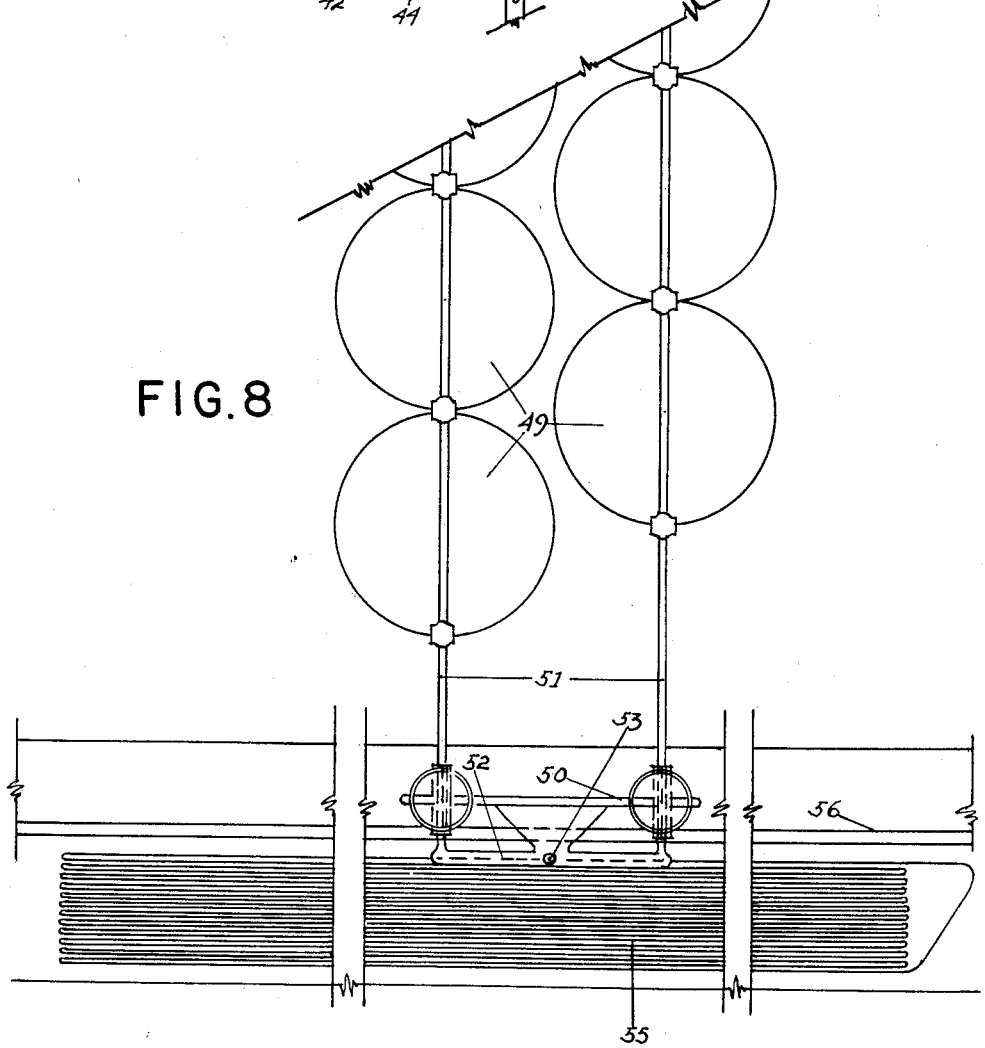
Figure 9:
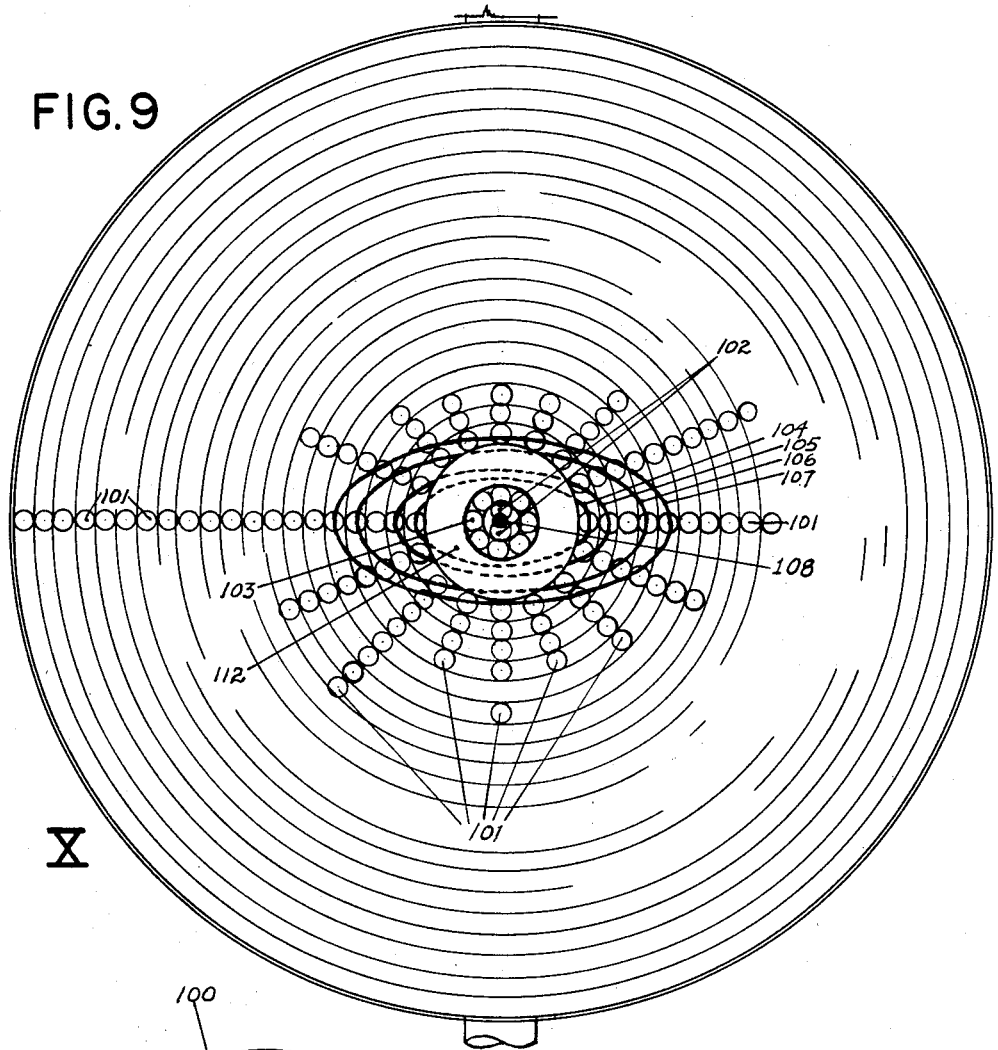
Figure 10:
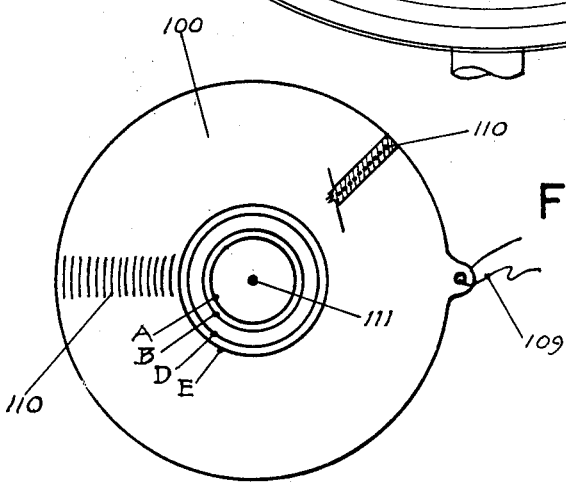
Figure 11:
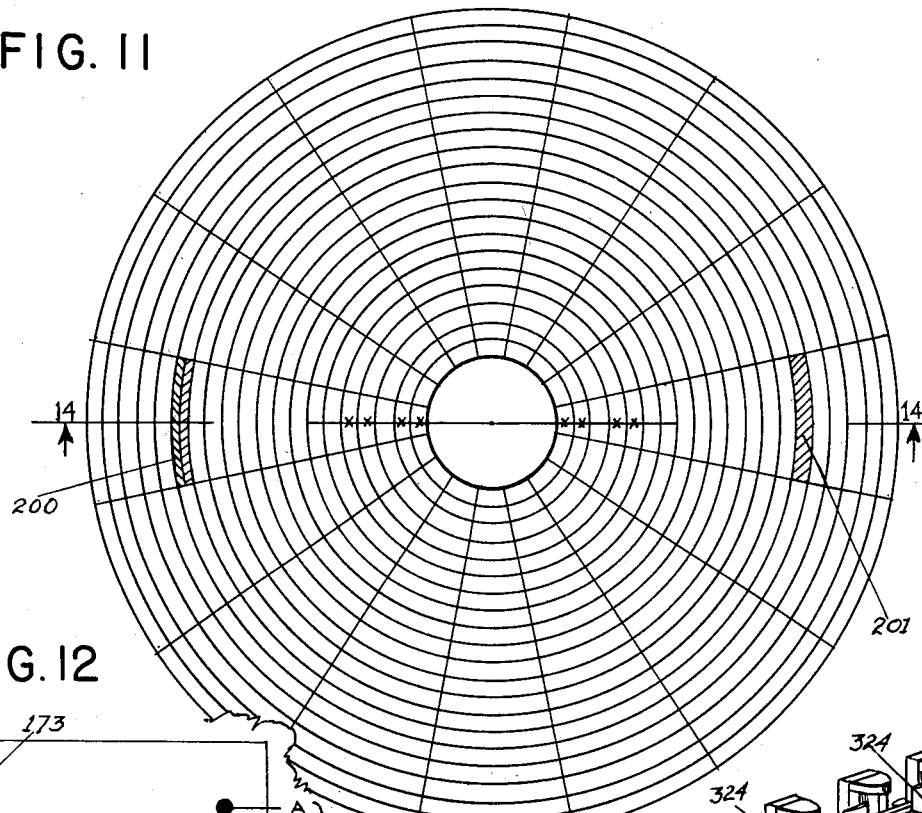
Figure 12:
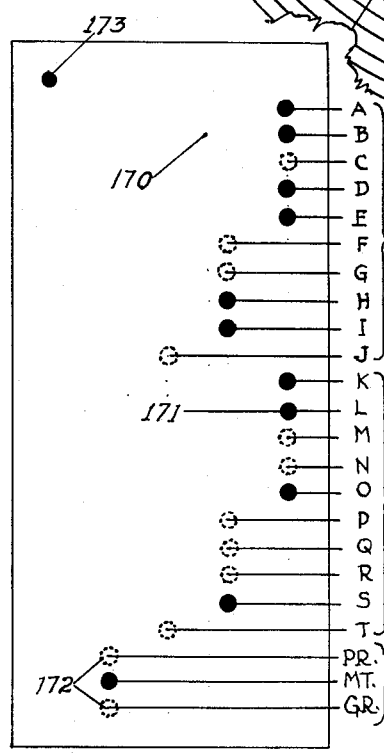
Figure 15A:
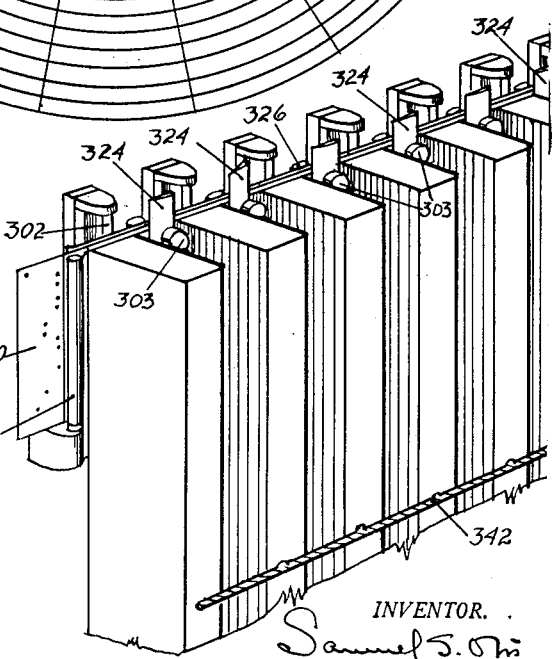
Figure 13:
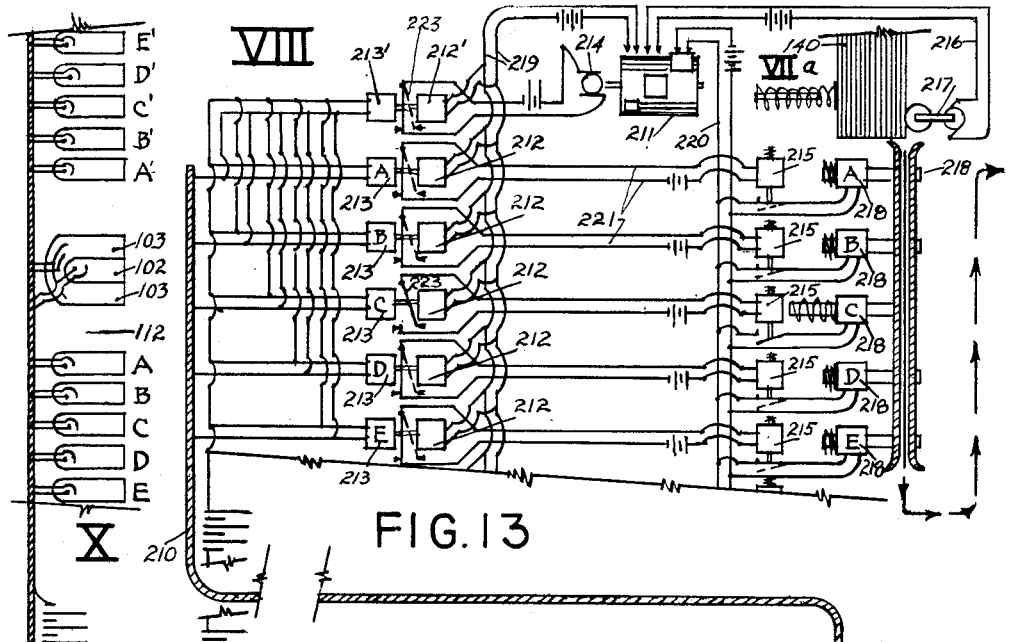
Figure 14:
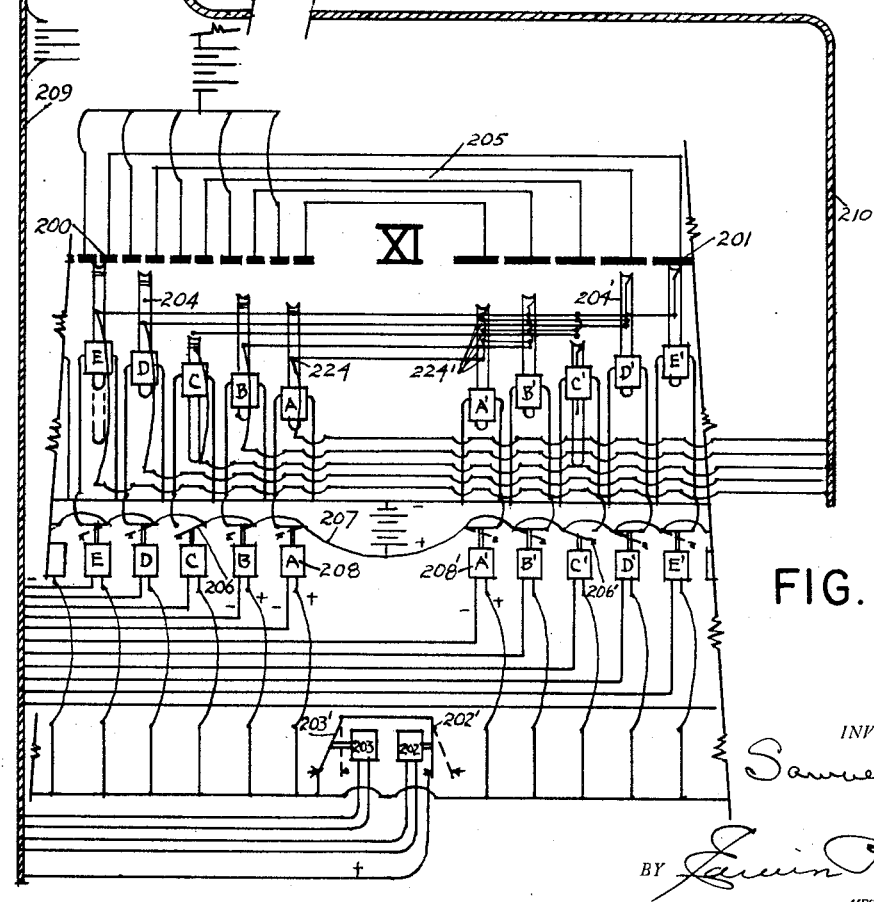
Figure 15:
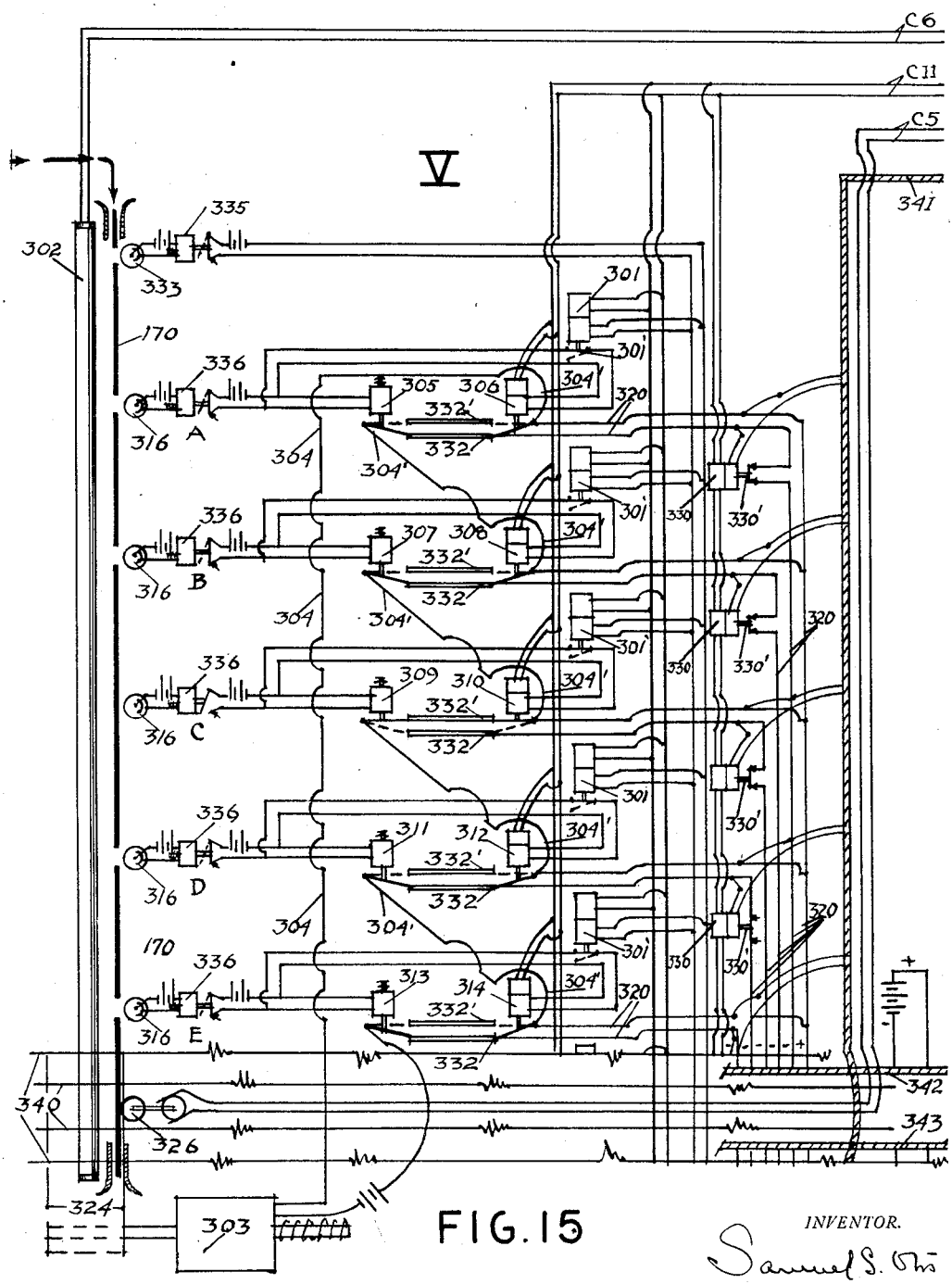
Figure 18:
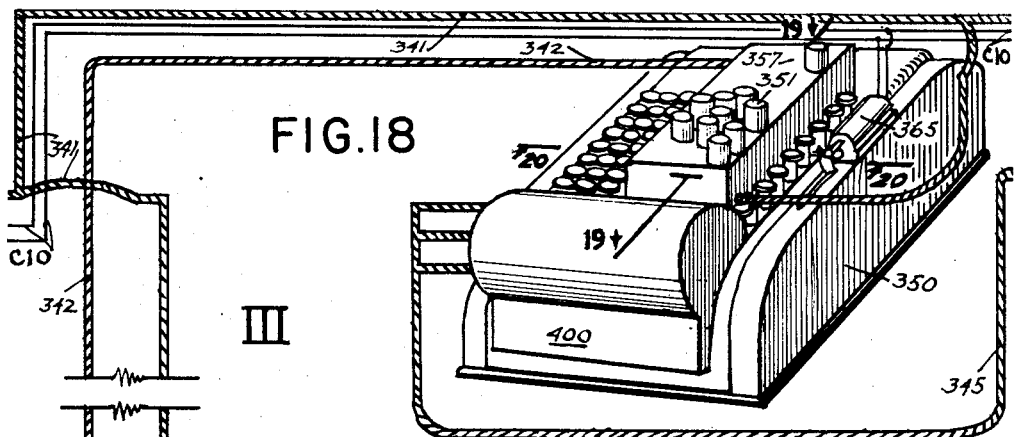
Figure 19:
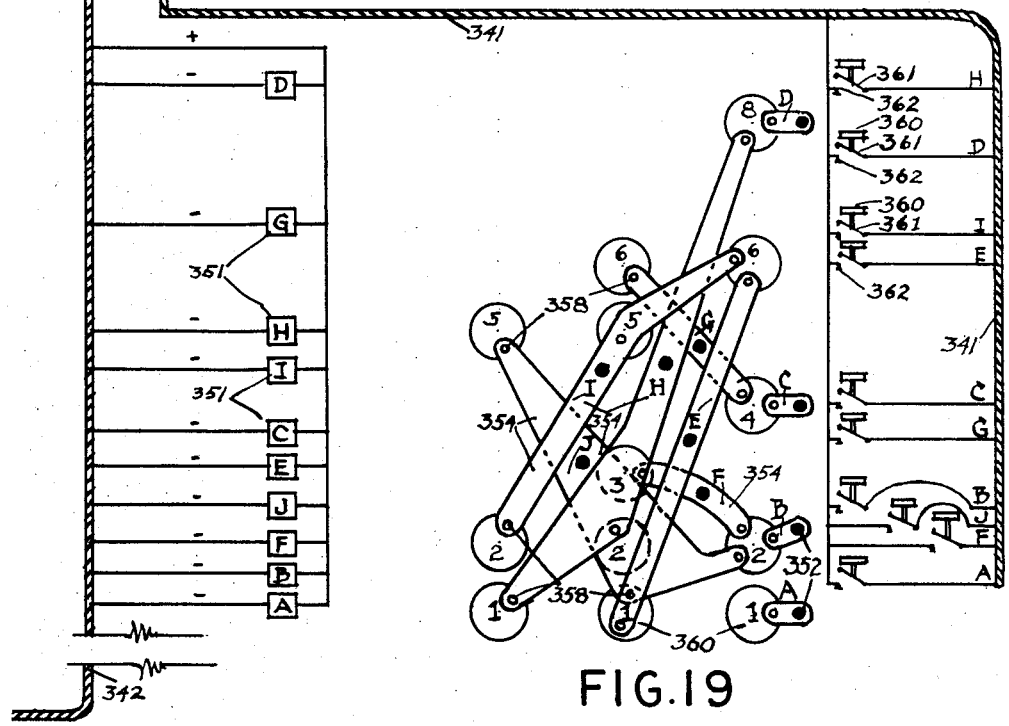
Figure 20:
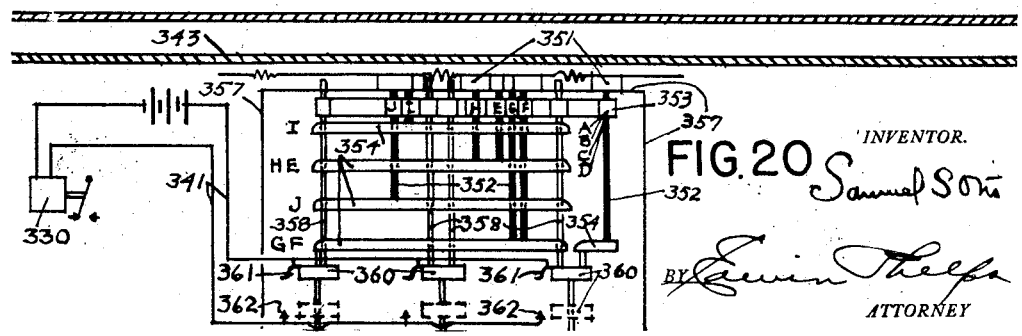
Figure 21:
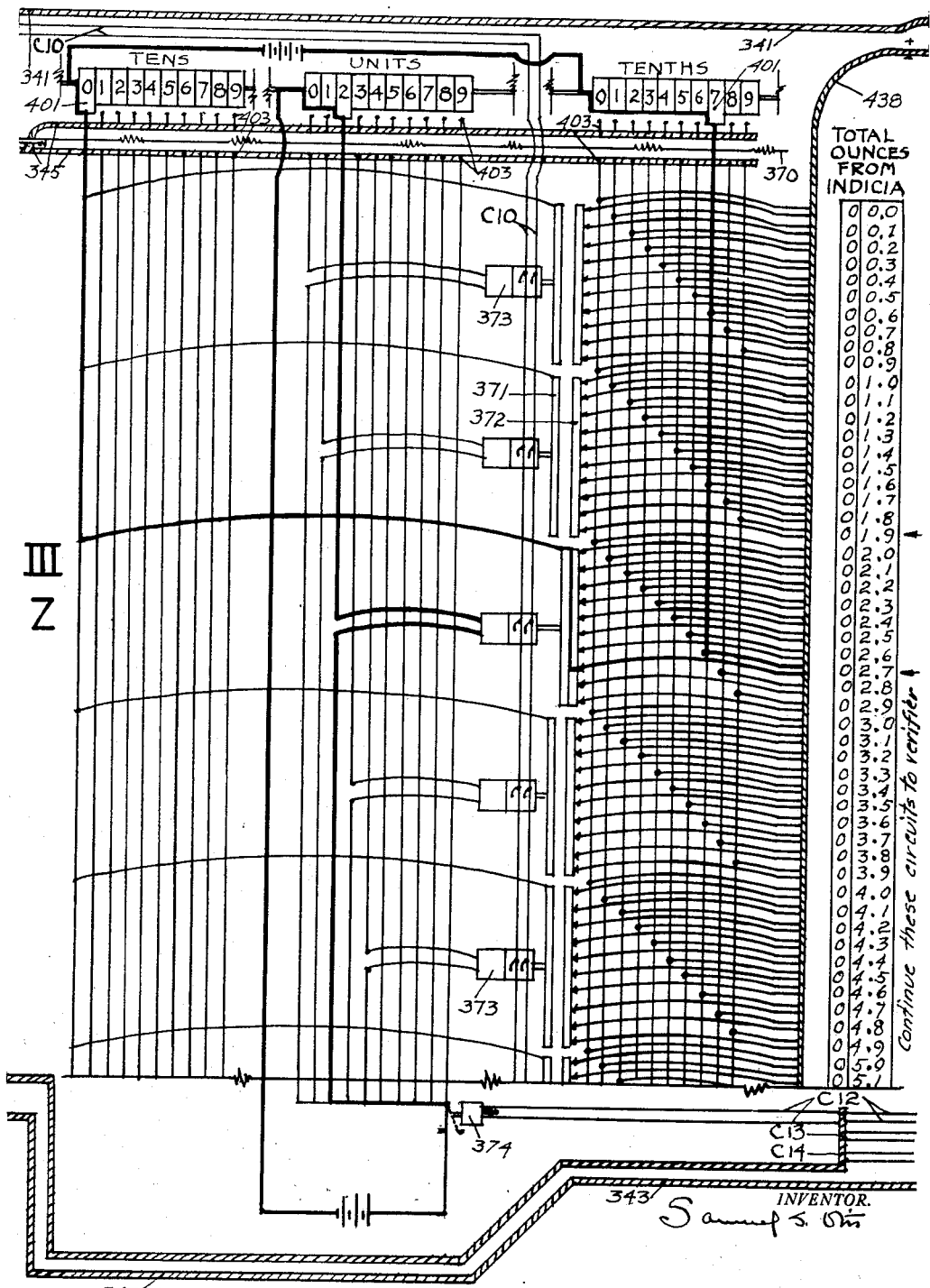
Figure 22:
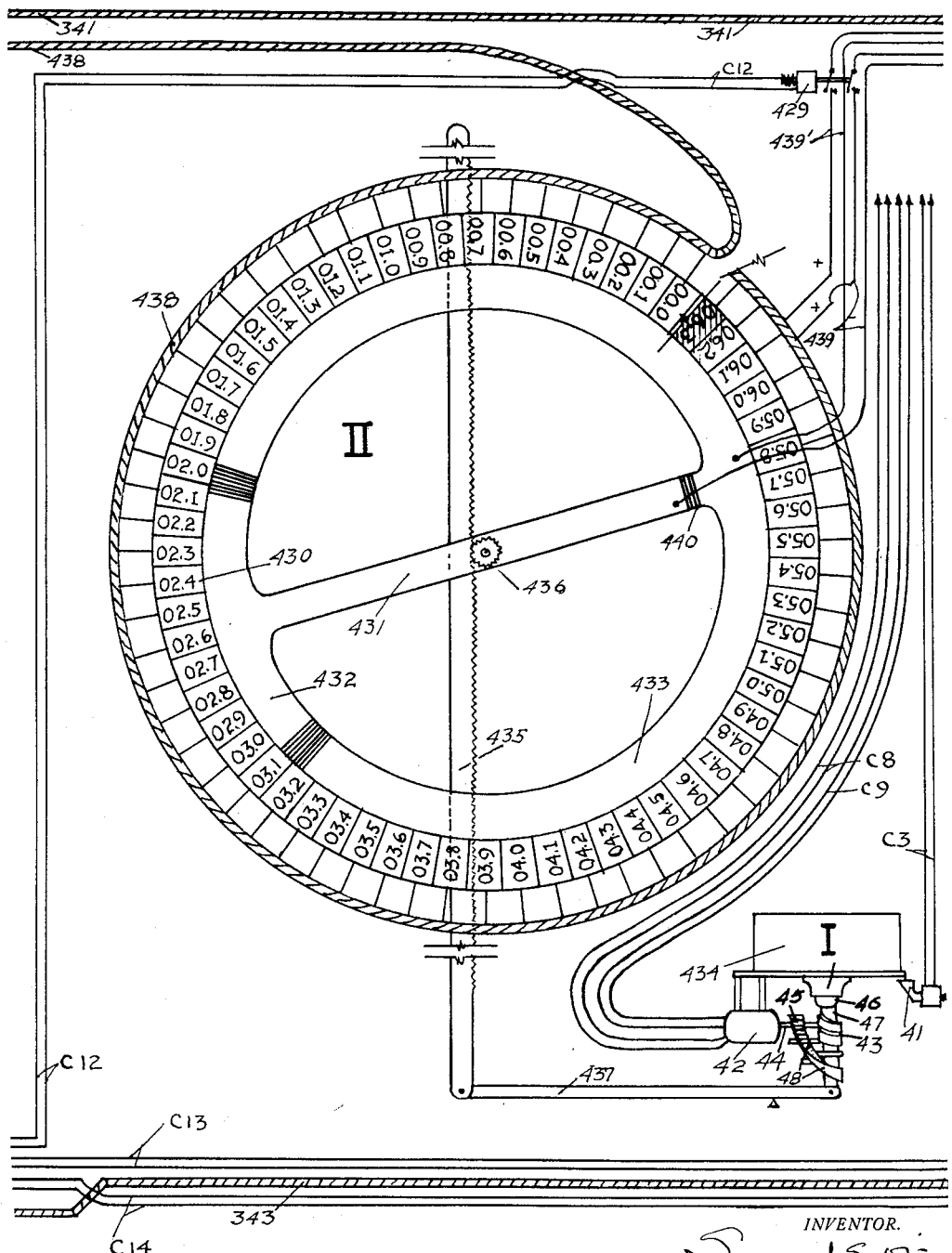

Fig. 7 is a fragmentary, diagrammatic view of a means for tilting and rotating the platform for the "trans-space" machine which supports a container and its goods, to so vary the positioning of the same and thereby so alter the relationship of the indicia tags to the shadow-creating rays as to secure recording of all the indicia and insure a proper and complete itemization and totalization of the price characteristics of all of the goods in the container;

Fig. 8 is an enlarged, fragmentary, diagrammatic elevation of the shadow detector mechanism, by which the shadows of the indicia tags cast by the light rays are caused to activate the operation of the sales check recording and issuing mechanism or its alternate;

Fig. 9 is a diagrammatic plan view of the general form of one of the shadow detector elements;

Fig. 10 is a plan view of a preferred type of index tag used on the goods for the "trans-space" recording type of machine;

Fig. 11 is a diagrammatic plan view of a possible form of a shadow activator unit;

Fig. 12 is a face view of the punch card used in the "trans-space" machine;

Fig. 13 is a diagrammatic view of a portion of the card punch unit for the "trans-space" machine;

Fig. 14 is a diagrammatic, fragmentary, cross-sectional view of the shadow activator shown in Fig. 11, the section being partially taken on the line 14—14 of that figure and a partial cross section of a shadow detector unit;

Fig. 15 is a diagrammatic view of a portion of the card-sensing unit whereby the punched cards such as shown in Fig. 12, effect the appropriate activation of the weight and price accumulators;

Fig. 15a is a fragmentary, diagrammatic, perspective of the battery of card-pattern-registering and rejecting elements;

Fig. 16 is a diagrammatic view of the synchronizing unit which controls the operation of the several principal units comprising the "trans-space" type of machine;

Fig. 17 is a similar view of the synchronizer emloyed in the "mechanical" type machine;

Fig. 18 is a perspective view of a conventional type registering accumulator, which has been equipped with a mechanism for controlling the weight verifier unit;

Fig. 19 is a plan view, partly diagrammatic, of one form of electrically-controlled mechanism for selectively actuating the keys of the accumulator shown in Fig. 18, the view being taken substantially on the plane of the line 19—19 of that figure;

Fig. 20 is a vertical cross section of the aforesaid accumulator-key actuating mechanism, as viewed from the plane of the line 20—20;

Fig. 21 is a diagrammatic view of one possible form of switch-board mechanism for control of the weight verifier unit;

Fig. 22 is a diagrammatic view of a part of a possible form of a commutator dial and contact-making weight-indicator for the weight verifier unit, the view indicating the alternative circuits which effect the operation of means auxiliary to the price accumulator for issuing either the sales check or a "See Mgr." slip;

Fig. 23 is a perspective view of a conventional type cash register (Price accumulator), with which is associated a check issuing device suitable for use in either one of the modifications herein disclosed;

Fig. 24 is a diagrammatical view of another form of electrically-controlled means for selectively actuating the keys of the aforesaid cash register and which could be used as an alternative to the mechanism shown in Fig. 19;

Fig. 24a is a diagrammatic perspective of the check issuing device;

Fig. 24b is a transverse section of the same taken on the line 24–b of Fig. 24–a;

Fig. 24c is a similar view taken on the line 24–c of Fig. 24–a;

4

Figure 1:
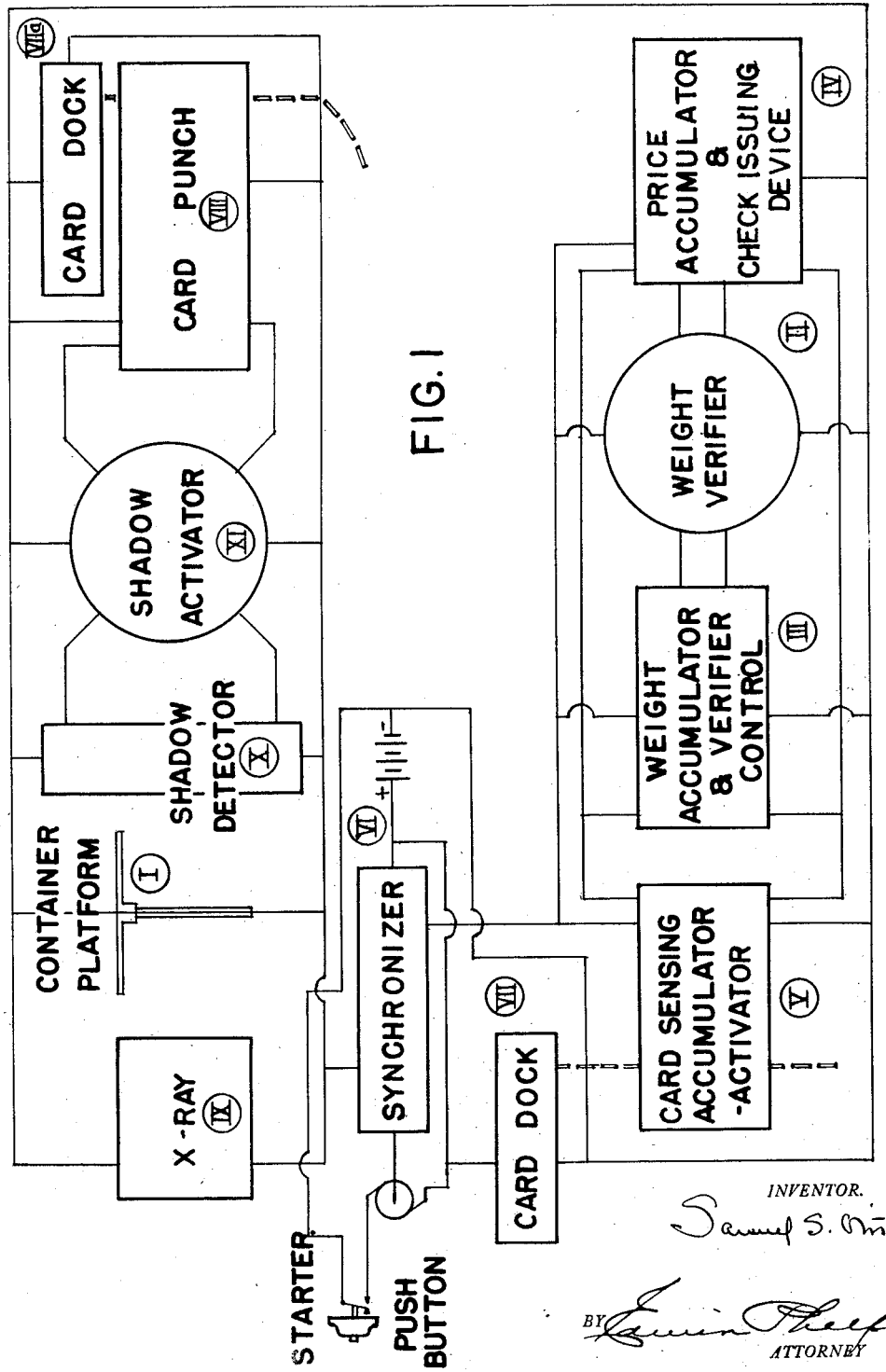
Fig. 1 is a schematic arrangement of the several principal units, mechanical and/or electrical, as they are associated in one or the other of the herein-disclosed embodiments of this invention.
Figures 30, 31, 32:
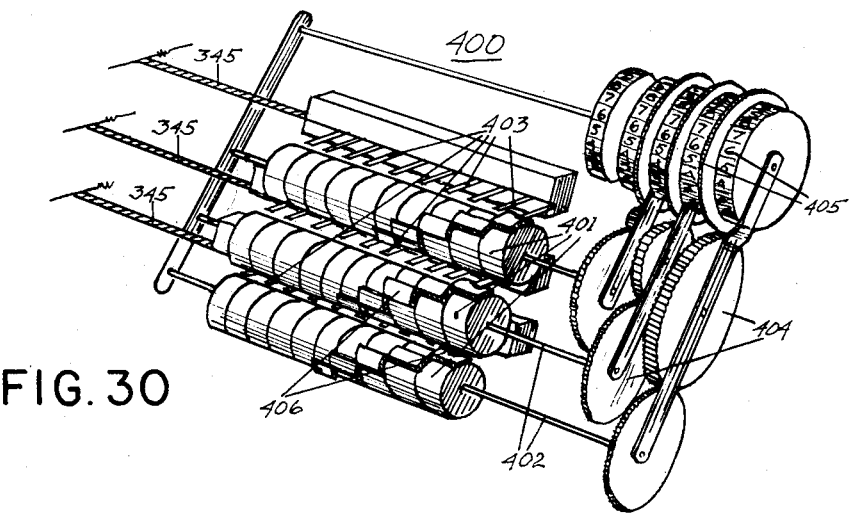

Fig. 25 is a diagrammatical plan view of a form of card sensing activator mechanism suitable for use with the "mechanical" type machine herein disclosed, a card being shown in sensing position;

Fig. 26 is a face view of a type of punched card for use with the aforesaid activator, showing the punching representative of the indicia for an article weighing 2 lbs. 9.1 oz. and priced at $2.75, as otherwise indicated on the card;

Fig. 27 is a diagrammatical elevational view of the illustration shown in Fig. 25, with the punched card shown in Fig. 26 about to enter into sensing position. The normally-open switches being shown closed, representative of the example punched on the card shown in Fig. 26;

Fig. 28 is a diagrammatic perspective of a possible solenoid arrangement, such as indicated in Fig. 24, for effecting the operation of the keys on either of the accumulators;

Fig. 29 is a time chart illustrating the sequential action of the several principal units of the "trans-space" type of machine as controlled by the synchronizer;

Fig. 30 is a fragmentary perspective of a form of suitable means for controlling the weight verifier;

Fig. 31 indicates the plan of combining Figs. 14 to 16 and 18 to 24 to comprehend the complete assembly of the main units comprised in the "trans-space" machine, a diagrammatic arrangement of which is shown in Fig. 1;

Fig. 32 indicates a similar plan for combining Figs. 17 to 27 to comprehend the complete assembly of the main units comprised in the "mechanical" type machine, a diagrammatic arrangement of which is shown in the lower portion of Fig. 1;

Fig. 33 is an enlarged and simplified exemplification of the shadow-detector transverse and vertical-motion mechanism diagrammatically illustrated in Fig. 8;

Fig. 34 is a transverse sectional view taken on the line 34—34 of Fig. 33, and

Fig. 35 is a vertical side elevation of Fig. 33.

*Changed shopping procedure*

This invention involves two simple alterations in the shopping procedure presently followed in self-service stores. One of these alterations requires each piece of merchandise to have associated therewith a card or tag which embodies indicia representative of the price characteristic of the article and at least one other inherent characteristic common to all of the merchandise in the store. For the embodiments herein shown, this other common characteristic is weight. However, some other characteristic such as volume or shape could be employed. The other procedure alteration requires the purchaser to place the container of selected goods on or in the machine and initiate its activation by the pushing of a button.

The goods having been thus indexed by the store, the purchasing process up to the point of placing the container in or on the machine remains unchanged. However, the store expense for personnel and space, and the customer delays and irritations at the check-out point can be vastly reduced, where not completely eliminated, by the use of a machine embodying this invention.

Since the functioning of either of the herein shown embodiments of this invention is predicated on the use of index cards and tags, it will be appropriate to first explain the basis upon which such cards and tags are constructed. To that end there is appended here the following "Table of Codes" which is the guide for forming the indicia on these cards and tags. (See attached sheet.) It will be understood that the number or assigned value of the indicia for either type characteristic selected is not limited to what is shown on this "Table of Codes."

Table of codes

| Characteristic | Identification Letter (Also used in identifying circuits) | Diameter of Resistive Rings in "modules" (modules for total diameter) |
|---|---|---|
| Weight, ounces: | | |
| .10 | A | 6+1=7 |
| .20 | B | 8+1=9 |
| .40 | C | 10+1=11 |
| .80 | D | 12+1=13 |
| 1.60 | E | 14+1=15 |
| 3.20 | F | 16+1=17 |
| 6.40 | G | 18+1=19 |
| 12.80 | H | 20+1=21 |
| 25.60 | I | 22+1=23 |
| 51.20 | J | 24+1=25 |
| Price: | | |
| $.01 | K | 26+1=27 |
| $.02 | L | 28+1=29 |
| $.04 | M | 30+1=30 |
| $.08 | N | 32+1=33 |
| $.16 | O | 34+1=35 |
| $.32 | P | 36+1=37 |
| $.64 | Q | 38+1=39 |
| $1.28 | R | 40+1=41 |
| $2.56 | S | 42+1=43 |
| $5.12 | T | 44+1=45 |

NOTE.—The starting size for "A" allows for clearance of center globule neutralizing ring.

The first column of this table represents an arbitrary selection of weight and price characteristics which can be variously combined to make a specific weight and price characteristic for any article likely to be available in a store for self-service within a certain predetermined range.

The second column indicates an arbitrary identifying letter, subsequent use of which, in explaining the construction and operation of the various mechanisms, will aid in understanding the invention. The third column indicates the varying arbitrary diameters of the resistive rings used in the tags for the "trans-space" type of machine. Incidently, it should be noted here, that throughout the drawings the "Identification letters" "A," "B," "C" etc. are applied to or, adjacent parts of the construction, the functions of which are related to the respective characteristics of the aforesaid "Table of Codes."

Machine activating cards and tags

The operation of the mechanism for issuing an itemized and totalized sale check for either of the herein-shown embodiments of this invention is controlled by an apertured card.

Figure 3:
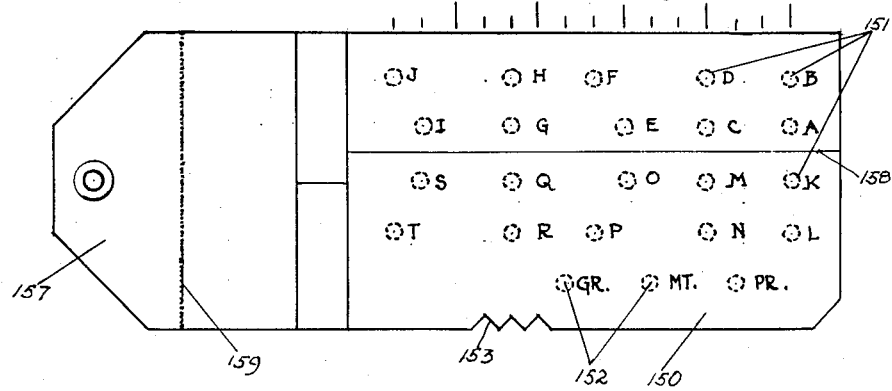
Fig. 3 is a view indicating a form of index card or tag suitable for use in this "mechanical" recording type machine.
Figure 4:
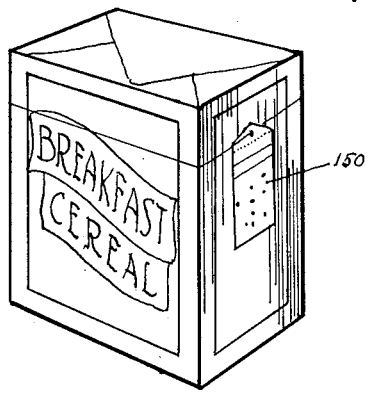
Fig. 4 is a perspective view of a carton of breakfast cereal, showing one way in which an index tag may be attached thereto.

The general form of a card, which is directly associated with the goods, for use in the "mechanical" type machine is shown in Fig. 3 and designated by the number 150. Such a card punched for a selected example based on the aforesaid "Table of Codes" is shown in Fig. 26. A punched card suitable for use with the "trans-space" type of machine is illustrated in Fig. 12 and designated by number 170.

The cards 150 for the "mechanical" type of machine are preformed in two respects: (1) punched to provide apertures 151 to represent the weight and price of the article wherewith it is to be associated and with apertures 152 to represent the appropriate store departments; and (2) formed with notches 153 which have the dual function of properly positioning the cards in the card dock and subsequently activating a switch 154 in a circuit 155 forming a part of a sensing mechanism to be later described.

The card shown in Fig. 3 has dotted circles indicative of maximum number of apertures 151 that can be punched to provide cards representative of any combination of the characteristics shown on the "Table of Codes." The letters "A," "B," "C," "D" etc. on the card are "identification letters" for the respective characteristics shown in the aforesaid "Table of Codes." The apertures 151 when formed, are on opposite sides of a longitudinal line 158, one group of such apertures representing the weight and the other group representing the price of the article wherewith the card is to be associated. Between the "price" apertures and the adjacent lateral edge of the card are located the apertures 152 representative of the store departments. It will be noted further that the rows of apertures 151 transversely of the card 150 are not uniformly spaced longitudinally of the card. This is because of the repetition of certain digits in certain of the columns of said "Table of Codes" and the ununiform spacing provides for an appropriate sequential operation of the sensing means, as will be explained later.

The cards 150 are designed either for attachment to an article or for association otherwise therewith. Attachment might be by a permanent or a removable leash, or association might be by means of a hook adjacent a stock of the corresponding articles.

Since the card 150 is to be disassociated from the article as an incident to effecting the operation of the "mechanical" type machine, the card is perforated at 159 to permit quick severance of the machine-operating section from the part whereby the card is attached to or otherwise associated with the goods. The stub 157 is formed with a suitable eyelet for an attaching leash. As indicated, the card has space for writing in or printing thereon the name of the article and its price and weight, for the benefit of the prospective purchaser.

The general form of the punch card 170 for the "trans-space" type of machine is shown in Fig. 12. Cards like this are punched during the operation of the machine as it is activated by "wave-influencing" tags 100, such as shown in Fig. 10, which remain directly attached to the goods when a container thereof is placed in the machine.

The cards 170, it will be noted from Fig. 12, provides for the maximum arrangement of apertures 171 that may have to be formed therein in order to have cards fully representative of all possible combinations of the weight and price characteristics shown in the "Table of Codes." This maximum number of apertures 171 is shown by the dotted, and fully blacked circles. Apertures 172 represent the three conventional store departments; i.e. groceries, meats, and produce. The aperture 173 has a special machine-operating function incident to the activation of the "Card-sensing Accumulator-activator Unit V" which will be explained subsequently. The black dots 171 on the card 170, like the full-lined circles on the card 150 shown in Fig. 26, have to do with the weight and price indicia of a specific article which is to be used in describing the operation of both of the herein-shown modifications of this invention. It will be noted further that, somewhat similarly to the card 150, the groups of apertures 171 are offset in columns transversely of the card with the apertures 172 and 173 further offset transversely of the card with respect to the columns of apertures 171 and 172 respectively. This is to provide for the proper sequential operation of the sensing means to be explained subsequently.

The tags 100 are herein-shown (Fig. 10) in the form of disks, each provided with a leach 109 of string or wire for possible attaching the tag to an article of merchandise. Within the disks are embedded rings 110 formed of a material capable of so influencing wave transmission means in the "trans-space" machine as to cause the punching of the cards 170, which subsequently are to effect the appropriate operation of the hereinafter-described sensing means. Since this particular embodiment of a "trans-space" machine employs Roentgen rays the rings 110 are formed of lead, lead salts, or titanium.

The number of rings 110 in any particular tag 100 will depend upon the combination of the "Table of Codes" characteristics required to index the appropriate weight and price of a particular article. Besides the required number of rings 110, each tag 100 has embedded at the center thereof a globule 111 of the above-mentioned ring material. The function of the globule 111 in connection with the rings 110 for effecting the punching of the cards 170 will be explained subsequently.

Primary machine units

Either type of machine involves the use of a "container platform I," whereon to set a container of selected goods wherewith indicia have been appropriately associated, a "weight verifier unit II," a "weight-accumulator and verifier control unit III," a "price-printing accumulator unit IV," a "card-sensing accumulator-activator unit V," the sequential and coordinated operation of which several units is controlled by a "synchronizer unit VI," the starting of which "synchronizer unit" is effected by a switch button 2.

For the "mechanical type" machine the encoded cards 150 (which serve as indicia) are pre-punched and are fed from a "card-dock VII" to the "card-sensing accumulator-activator unit V."

For the "trans-space" type of machine blank cards 170, from a "card dock VIIa," are perforated in a "punch unit VIII" activated as the result of shadows of indicia cast by an "X-ray unit IX" which shadows are picked up by a "shadow detector unit X" from which electrical impulses are transmitted to the "punch unit VIII" through a "shadow activator unit XI," the sequential and coordinated operation of which several units is controlled by the "synchronizer unit VI," Fig. 1 diagrammatically illustrates the general relationship of the aforesaid units for both types of machines now to be explained.

Figure 6:
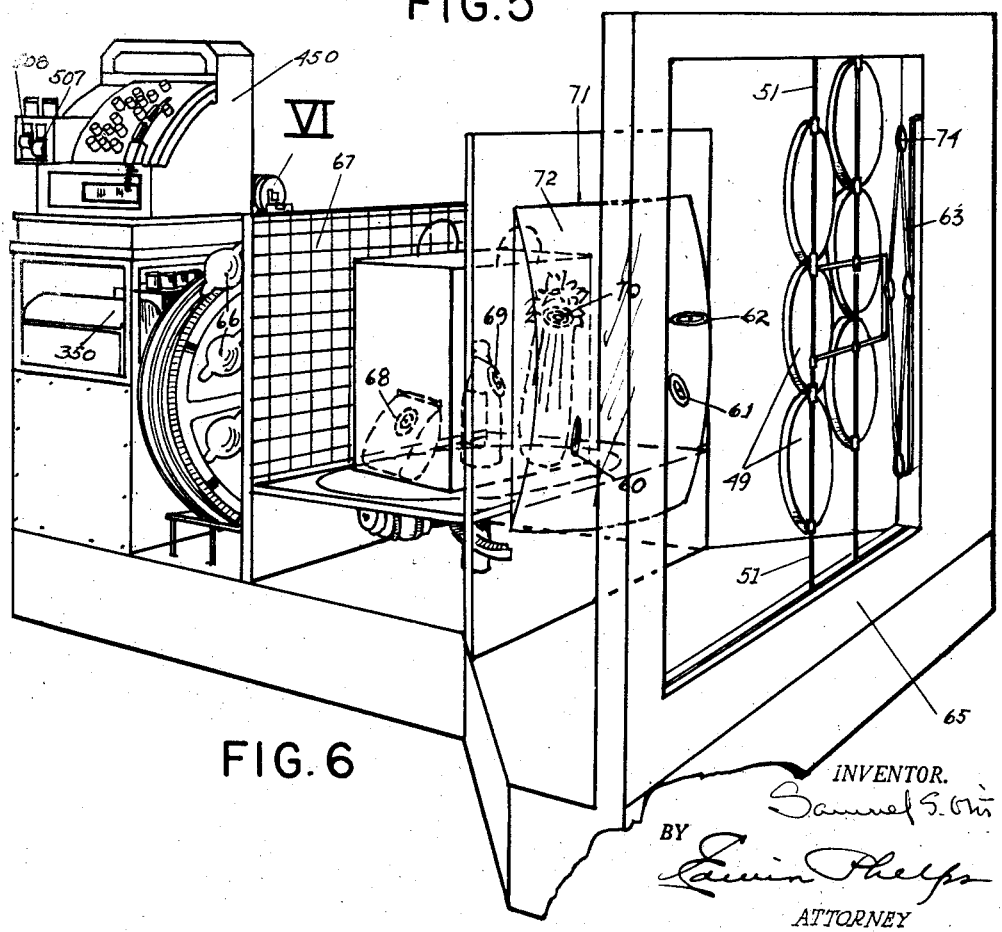
Fig. 6 is a diagrammatic perspective of the shadow-producing and activating mechanism for the "trans-space" recording machine and which controls the production of the perforate cards which effect the issuance of the printed sales check or its alternate.

The "container platform I" is essentially a conventional scale platform, the beam 437 of which (Fig. 22) is connected to the "weight verifier unit II." Because of the necessity of providing for a relative rotation and tilting of the "platform I" and the wave producing means for the "trans-space" machine, as will be explained more fully hereinafter, the platform I is swiveled at 46 on a post 47 connected to the scale beam 437 as indicated in Figs. 6 and 7. To effect the required tilting and rotating of the platform I, a motor 42 is secured to the underside of the platform and connected to a source of power through the "synchronizer unit VI." The motor shaft 44 mounts a pinion 45 meshing with an arcuate-shaped rack 48 attached to the post 47. The end of the shaft 44 extends into a guide slot 43 in the post 47 to provide a suitable bearing therefor and insure an effective meshing of the pinion 45 with the rack 48. A solenoid-actuated latch 41 (see Fig. 22) normally holds the platform I unactivated.

The "weight verifier unit II" (Fig. 22) comprises a relatively rotating commutator 430 and contactor 431 which are respectively comparable to the dial and the pointer of a conventional scale and serve to register the actual weight of a container of goods on the platform I. As herein illustrated, the commutator 430 is stationary and is in the form of an annulus with the insulated segments comparatively large and each representing a tenth of a unit. Since the characteristics of the "Table of Codes" are compiled on the basis of ounces these commutator segments each represent a tenth of an ounce. Obviously, the size of the segments determines how many can be accommodated within a single annulus. How many segments would be required would be determined by the maximum weight for the registration of which provision has to be made. If the required number of segments cannot be arranged within a single annulus the commutator 430 could be constructed in the form of a spiral and the contactor 431 could be arranged to move axially as it is rotated.

The contactor 431 is in the form of a bar, rotatably mounted on an axis concentric with the axis of the commutator 430, and mounting insulated segments 432 and 433, which traverse and contact the commutator 430. As will be noted from Fig. 22, the segment 432 is much shorter than the segment 433, said segments being insulated from each other as indicated at 440. The smaller contact segment 432 will hereafter be referred to as the "accord" segment and the other and larger segment 433 will be referred to as the "disaccord" segment. The contactor 431 is connected by a suitable mechanism to the "container platform I" so that the rotation of the contactor segments 432 and 433 around the commutator 430 is determined by the vertical movement of the "platform I" when a container 434 of goods is placed thereon. Any conventional scale means may be used for this purpose which in Fig. 22 is diagrammatically illustrated by a pinion 436 on the segment supporting bar of the contactor 431 meshing with a rack 435 attached by indirect means to the scale beam 437 connected to the "platform I."

As indicated in Fig. 1, the "weight verifier unit II" is interposed between the verifier control mechanism associated with the "weight-accumulator unit III" and the "price-printing accumulator unit IV" so as to effect the issuance of either a "sales check" or a "See Mgr." slip, depending upon whether there is an accord or disaccord respectively between the actual weight registered on the "verifier unit II" and the indicated weight transmitted by the "card-controlled accumulator-activator unit V," as will be explained more fully hereinafter.

Each segment of the commutator 430 is connected in parallel by a circuit cable 438 to the switchboard "Z" (see Fig. 21), forming a part of the "weight verifier control mechanism" associated with the "weight accumulator unit III," and to the check printing and issuing device 500 associated with the "price accumulator unit IV" (see Fig. 23). The "accord" and "disaccord" segments 432 and 433 of the contactor 431 are connected by circuits 439 and 439' (see Fig. 22) to this check issuing device 500.

The "weight-accumulator and verifier-control unit III" (see Figs. 18, 19, and 20) comprises a conventional key-operated calculating machine 350, whereon is arranged the verifier control mechanism 400 and wherewith is associated the switchboard "Z" (see Fig. 21) through which solenoids 351 are energized for effecting a depression of the keys 360 of said calculating machine 350.

Since the indicia, on which the operation of the machine depends, are representative of the arbitrary weight characteristics or combinations thereof shown in the aforesaid "Table of Codes," the calculating machine 350 requires the use of only those keys 360 in the several columns on the machine corresponding with the several different digits in each of the columns shown on the aforesaid "Table of Codes." On this "Table of Codes" only five of the different digits 0 to 9 appear in two of these columns (namely, "1," "2," "4," "6" and "8" and "1," "2," "3," "5" and "6" respectively) in the first and second columns and only three of the ten digits for the third column (namely, "1," "2" and "5"). Therefore, as illustrated in Figs. 18 and 19, for the column representative of "tenths," in the calculating machine 350, only keys for "1," "2," "4," "6" and "8" are required; for the column representative of "units" only keys "1," "2," "3," "5" and "6" are required; and for the column representative of "tens" only keys "1," "2" and "5" are required. Those are the only keys required on a calculating machine 350 for the range of weights or combinations thereof shown in the aforesaid "Table of Codes." If the "Table of Codes" were to be expanded to take in a greater range of weights the use of other keys in the aforesaid columns and in other columns would have to be provided for on the calculator.

In the "Table of Codes" it will be noted that "2" appears three times in the first place after the decimal for the "weight" characteristics and in the second column after the decimal for the "price" characteristics. "4," "6" and "8" each appear twice in the same columns of the respective "weight" and "price" characteristics. "1" appears twice in the first column before the decimal for the "weight" characteristics and in the first column after the decimal for the "price" characteristics. Because of this duplication of numbers in these columns the key-operating means for the weight-accumulator 350 has to effect the depression of the "tenths" "2" key (1) independently, (2) in unison with the "units" "3" key, and (3) in unison with the "tens" "5" key and the "unit" "1" key. Similarly, the "4" and "8" keys in the "tenths" column have to be depressed independently and in unison with other keys in the "units" and "tens" column. The "6" key in the "tenths" column has to be depressed in unison with different keys in the "units" and "tens" column. A comparable operation of the keys of the "price accumulator unit IV" has to be effected.

Figs. 19 and 20 and Fig. 24 respectively illustrate alternate ways of effecting this result of independent and unison operation of the keys for either of the accumulators.

The arrangement shown in Figs. 18–20 provide a housing 357 shaped to fit over the rows of keys for the calculator 350 wherein are located the keys that have to be depressed as above explained. On this housing 357, are mounted the solenoids 351 the extended armatures 352 which are positioned to effect the required key operation. The extended armatures 352, slidably supported in the guide plate 353, are connected to platens 354, the pins 358 of which make the actual contact with the respective keys 360. The pins 358 are also slidably supported in the guide plate 353.

For the "tenths" keys "1," "2," "4" and "8," there are platens 354 for effecting their individual operation (see Fig. 19). However, except for the "1" key, these and certain of the other keys hereinbefore identified have to be connected for simultaneous operation for reasons already explained. For example, the "tenths" "2" key is connected by a platen 354 for simultaneous operation with the "units" "1" key and with the "tens" "5," to register the "characteristic" 51.20, and by another platen 354 for operation with the "units" "3" key, to register the "characteristic" 3.20. Similarly, the "tenths" "8" key is connected by a platen 354 with the "units" "2" key and the "tens" "1" key, to register the "characteristic" 12.80.

The solenoids 351, through the cable 342, are connected in circuits controlled by the solenoid-operated switches 161 (see Fig. 27), of the "weight" section of the "card-sensing accumulator-activator unit V" for the "mechanical" embodiment of this invention and in circuits controlled by the switches operated by the solenoids 306, 308, 310, etc. respectively (see Fig. 15), for the "weight" section of the "card-sensing accumulator-activator unit V" of the "trans-space" embodiment of this invention, which latter unit will be explained presently.

When the form of key-depressing mechanism shown in Figs. 18, 19 and 20 is used with the "trans-space" embodiment of this invention, each of the keys 360 is provided with an insulated contact 361 for coaction with a contact 362 to close the respective circuit 341 to a solenoid 330 to effect the opening of the switches controlled by the solenoids 330 so as to break the circuit which operates the respective solenoids 351 and thereby permit their return after their depression to actuate the accumulator keys. If this key-operating platen arrangement were used on the "price-accumulator unit IV" a solenoid for operating the motor bar would have to be included in the circuit 341 controlled by the contacts 361 and 362, as will be pointed out later in describing an alternative form of key-operating mechanism.

The conventional clearing bar 365 for the weight calculator 350 would have a solenoid arranged thereon and connected to the "synchronizer unit VI" so that after each cycle of operation the calculator 350 is cleared for subsequent operation.

The verifier control 400 associated with the "weight accumulator unit III" (see Fig. 30) comprises a battery of commutator elements 401 insulatedly journaled on shafts 402 and positioned to be contacted by brushes 403, as the commutators 401 are rotated through gearing 404 attached to the conventional "answer" dials 405 of the calculating machine 350. In the completed machine, embodying this invention, there would be as many of these commutator elements 401 and co-acting brushes 403 as there are columns of digits, shown on both sides of the decimal point in the "Table of Codes." For the purpose of illustration, Fig. 30 shows only three of these commutators, brushes, and their connection to the "answer" wheels, these conforming with the "tenths," "units," and "tens" of said "Table of Codes."

Each commutator 401 has ten contacts 406 which are axially and circumferentially spaced, as most clearly appears in Fig. 30. Cables 345 lead from the brushes 403 to the switchboard "Z" (see Fig. 21) whereat electrical circuits are established and transmitted to the "weight verifier unit II" through cable circuits 438.

The general form of the switchboard "Z" is diagrammatically indicated in Fig. 21. In this figure above the line 370, the three sets of commutators 401 and brushes 403 are diagrammatically indicated, the commutator being simulated by the juxtapositioned rectangles and the brushes by the adjacent dots. As here shown the dots have leads to the cable 345. Below the line 370 is diagrammatically represented a fragment of the total switchboard "Z." The extended rectangles "0," "2" and "7" and the heavy lines represent the closing of a circuit for an example hereinafter explained in describing the operation of the machine.

The switchboard "Z" comprises a battery of pairs of relatively movable contact elements 371 and 372, there being a pair of such elements for each ascending ten tenths of an ounce from "0" to the highest number in the "Table of Codes." The indicated contact points on the elements 372 through the cable circuit 438, are successively connected in circuit with the corresponding segments of the commutator 430 for the "verifier control unit II."

Each of the contact elements 371 is mounted on the armature of a solenoid 373. In successive groups of ten these solenoids 373 are successively connected in circuit with the brushes for segments "0" to "9" for the "units" commutator 401 of the verifier control 400. That is, the first solenoid 373 of the first group of ten is connected in circuit with the brush 403 for the "0" segment on the "units" verifier commutator 401 (Fig. 30); the second solenoid of the first group of ten is connected in circuit with the brush 403 for the "1" segment of the "units" of the verifier control commutator 401; and so on, successively, as shown in Fig. 21, to the tenth solenoid 373 of the first group of such solenoids which will be connected in circuit with the brush 403 for the "9" segment of the "units" verifier control commutator 401. The series of solenoids 373 for the second, third, fourth and so on groups of the ten contact elements 371 would be similarly connected in circuit successively with the brushes 403 for the "0" to "9" segments of the "units" commutator for the verifier control 400. The circuits leading to the solenoids 373 are all controlled by a solenoid switch 374 connected to the "synchronizer unit VI" All of the solenoids 373 are reverse powered through another circuit leading to the "synchronizer unit VI" (see Figs. 16 and 17) to be explained presently.

The first ten of the movable contact elements 371 are connected in circuit with the brush 403 for the '0" segment of the "tens" commutator 401 for the verifier control 400, as indicated in Fig. 21. The second ten movable contact elements 371 are similarly connected in circuit with the brush 403 of the "1" segment of the "tens" commutator 401 of the verifier control 400. The tenth ten movable contact elements 371 are connected in circuit with the brush of the "9" segment of the "tens" commutator 401 for the verifier control 400.

The "price-accumulator and check-issuing device unit IV" (Figs 23–24) comprises essentially a conventional cash register 450 wherewith is arranged a check-issuing device 500.

As was previously explained with respect to the calculating machine 350 for the "weight-accumulator unit III," only certain of the keys for the conventional cash register 450 will be required (see Fig. 24). These will be the same group of keys as required for the calculating machine 350, namely; "1" "2" "4" "6" and "8" in the second column to the right of the decimal (the "cents"); the "10" "20" "30" "50" and "60" in the first column to the right of the decimal (the "tens"); and "1" "2" and "5" in the "units" column (the "dollars"). The cash register thus employed in this invention retains the standard store department keys (grocery 451, meat 452 and produce 453), the motor bar 460, and a "totalizing" mechanism. In addition, for use with either embodiment of this invention there is a "total and subtract" mechanism. With the latter two of these mechanisms there is associated an indicator 470 actuated by a spring retracted solenoid or a motor 471. When required or desired, other keys could be retained on the cash register and suitable provision made for their operation, such as a "tax" key.

The motor bar 460, and the mechanism it operates, is the conventional means for cash registers of this kind and is actuated after each setting of the keys for the purpose of printing the representative amount of the keys on the subsequently-issued sales check and carrying the same over into the machine accumulator mechanism for final registering on the machine totalizing and check printing and issuing mechanism. The motor bar 460, of course, has to be activated for effecting the totalizing operation of the register as it was for the printing of these individual items. Accordingly, the solenoid 351' associated with the motor bar 460 has a dual winding one of which is connected by a circuit to the "synchronizer unit VI."

As hereinbefore and hereinafter indicated, on exceptionable occasions the "weight verifier unit II" may register a disaccord between the actual and the indicated weight of a container of goods on the platform I. It is for this reason that a "total and subtract" mechanism is so arranged that when this disaccord does occur and the indicator bar 470 is shifted the total of the several items, although transmitted to the register permanent record and printed on the sales check, will be immediately subtracted from this permanent recording mechanism.

As with the weight-accumulator calculator 350, certain of these keys of the cash register 450 have to be operated individually and in different combinations. For example, the "2" key has to be operated individually and in combination with the "30" key (.32 circuit "P") and with the "$5" and the "10" key (5.12 circuit "T"). The "4" key has to be operated independently and in combination with the "60" (.64 circuit "Q"); the "6" key has to be operated in combination with the "10" key (.16 circuit "O") and with "$2" and the "50" keys (2.56 circuit "S"). The "8" key has to be operated independently and in combination with the "$1" and "20" keys (1.28 circuit "R"). The reasons for this will be increasingly apparent from an examination of the hereinbefore mentioned "Table of Codes."

The same solenoid-operating mechanism shown in Figs. 19 and 20 could be employed to effect the afore-mentioned key operations. However, Fig. 24 shows a modified form of solenoid-operating mechanism for acomplishing this individual and combination key operation. Incidentally this modified arrangement could be used on the calculating machine 350 in place of the mechanism above described. As with the other accumulator key-operating mechanism previously explained, a housing 357 is provided here, to fit over the columns of keys, wherein are located the keys that have to be depressed. On this housing 357 are mounted the solenoids 351' for operating the keys 360'.

Single solenoids 351' are arranged for the "$1" "$2" "$5" "20¢" "30¢" "50¢" "60¢" and "1¢" keys. Pairs of solenoids 351' are arranged for the "10¢" "4¢" "6¢" and "8¢" keys and the motor bar 460. Three solenoids 351' are arranged for the "2¢" key (see Fig. 28). Similar single solenoids are provided for the department keys "gr." groceries "mt." (meat) and "pr." (produce). The manner of connecting the armatures 352' of the two or three solenoids 351' to operate a single key is diagrammatically illustrated in Fig. 28. For such solenoids the armatures 352' have flexible transverse extensions which contact the key 360'.

The solenoids 351' for the keys which have to operate in unison, of course, are connected in series, and they, with all the other solenoids for the "price" keys and the store "department" keys, are connected through the cable 343 in circuits controlled by the solenoid-operated switches 161 (see Fig. 27) for the "price" section of the "card-sensing accumulator-activator unit V" for the "mechanical" type machine and in circuits controlled by switches operated by the solenoids 306, 308, 310, etc. (see Fig. 15) for the "price" section of the "card-sensing accumulator-activator unit V" for the "trans-space" type machine, which latter units will be explained presently.

When such an automatically-operated cash register is used in either embodiment of this invention, means has to be associated with the keys 360' to effect the operation of the motor bar 460 after each key operation. To this end, as shown in Figs. 24 and 28, coacting contacts 361' and 362' are provided for each circuit 341 leading to one of the coils for the solenoid 351' for the motor bar 460. When this form of key-operating mechanism is used with the "trans-space" embodiment of this invention, each of said circuits 341 also has to include a branch lead to the respective solenoid-operated switch 330 (see Figs. 15 and 28) for each of the card-pattern-registering and -rejecting elements of the "card-sensing accumulator-activator unit V" to be described hereinafter. This is required so as to effect the opening of the switches 330 and break the circuit which operated the respective solenoids 351' to permit their return to normal position after once being depressed.

The check issuing device 500 would involve the usual sales-check-printing and -issuing mechanism of the conventional cash register with which would be associated either an auxiliary type face for printing "See Mgr." on a second strip of paper synchronized with a strip of paper for the sales check, or a second strip of paper on which "See Mgr." was consecutively printed and the feed of the strip synchronized with the feed of the sales check strip. This latter is the presently-preferred method, and is diagrammatically illustrated in Figs. 24a, 24b, and 24c.

Individual items represented by the register keys as they are depressed are printed seriatim on the sales check strip of paper with each depression of the motor bar 460 as previously explained. The total of these items is printed on the sales check strip following the motor bar depression after the indicator 470 has been shifted to gear the mechanism arranged in the register for such printing. Such printing of the "total" will take place regardless of whether the "weight verifier unit II" registers "accord" or "disaccord" between the actual and the indicated weight of the goods on the platform I. However, whether the sales check 501 or the "See Mgr." slip issues depends upon whether the "weight verifier unit II" registers "accord" or "disaccord." To that end a solenoid 506 for operating slotted doors 502 and 503 and a solenoid 509 for operating a knife 504 are arranged to be appropriately conditioned by the "Weight Verifier Unit II" for activation by the "Synchronizer Unit VI," as will be explained presently.

The slotted doors 502 and 503 are connected together by a walking beam 505 so as to move in unison. This beam is connected to the solenoid 506 which is spring-actuated to bias the doors 502 and 503 for the issuance of a sales check 501 through a slot 507 and the deflection of the "See Mgr." slip into the machine housing I. (See Figs. 24–a, 24–b, and 24–c.) This solenoid 506 is connected in the "disaccord" circuit 439' (see Fig. 22) hence is operated against the action of its spring only when the "weight verifier unit II" registers a "disaccord" at which time the normal positions of the doors 502 and 503 are reversed so that the slot 508 and the door 503 is brought into position to permit the issuance of the "See Mgr." slip and the slot 507 of the door 502 is retracted so that the door deflects the sales check 501 into the machine housing I. The knife 504 is connected to the spring-actuated solenoid 509 which is activated by the "synchronized unit IV" near the end of its cycle of operation to simultaneously sever both the sales check 501 and the "See Mgr." slip from their respective strips.

The "card-sensing accumulator-activator unit V" could be any kind of a device whereby machine-activated currents are produced by the passing of specially-formed index elements over appropriate sensing means. For both of the modifications of this invention herein shown, punched cards are passed between photoelectric cells and a source of illumination. The form of this sensing means has to be differently constructed for the "mechanical" and "trans-space" types of machine. The respective forms of sensing mechanism are shown in Figs. 25 and 27 and Fig. 15 respectively. Because of its simpler construction the "card-sensing accumulator-activator unit V" for the "mechanical" embodiment of this invention will be explained first.

The "card-sensing accumulator-activator unit V" for said "mechanical" embodiment shown in (Figs. 25 and 27) comprises a battery of photoelectric cells 156, a battery of spring-retracted, solenoid-operated switches 161, a source of illumination 160, and a card feed 162 associated with the "card dock unit VII."

The cells 156, one for each of the characteristics in the "Table of Codes" and the three store departments (See Fig. 27), are arranged in spaced rows transversely and longitudinally of the direction of movement of the index cards 150 as they are fed from the "card dock unit VII" by the card feed 162. Longitudinally of the movement of the cards 150 the cells 156 are spaced uniformly. Transversely, the cells 156 are connected in groups so as to cause the successive individual and combination depression of the accumulator keys as herein noted.

In the battery of normally-open solenoid switches 161 there is one for each of the characteristics on the "Table of Codes" and one for each of the three store departments. These solenoids are connected to the corresponding photoelectric cells 156 through cable circuits 163 and 164 and the power line 155. The switch contacts are connected to the cable circuits 342 and 343 leading respectively to the "weight" and "price" accumulators III and IV. The normally-open switch 154 is interposed in the power line 155 to be actuated by the card recesses 153 through the medium of a rod 165 on the end of which is a button 166 contactable by the perimeters of the card recesses 153 (see Fig. 25).

The source of illumination 160 is arranged adjacently parallel to the photoelectric cells 156 and connected to the "synchronizer unit VI," as will be explained presently.

The card feed 162 comprises a suitable arrangement of motor-driven rollers, the operation of which is controlled by the "synchronizer unit VI."

The "card-sensing and accumulator-activator unit V" for the "trans-space" embodiment of this invention is a much more extensive structure than that just explained for use with the "mechanical" type of machine. This is for the reason that the two or more scannings of the "shadow detector unit X," as will be set forth more fully subsequently, very likely will result in the punching of more than one card 170 for certain of the goods in a container 434. Such being the case, it is necessary to so construct the card-sensing means for the "trans-space" type of machine that once the punched pattern of a card 170 for a certain piece of merchandise has conditioned the sensing means for activating the weight- and price-accumulators a second card—if one should be punched for said certain piece of merchandise—will be incapable of effecting the operation of the accumulators. Accordingly, the card sensing action of this "accumulator-activator unit V" for the "trans-space" type of machine is constructed so as to set up a "pattern," one for each differently punched card—which pattern will be effective to appropriately operate the accumulators—but eliminate any other cards having the identical punched pattern and passing the sensing means during the same cycle of operation.

To this end, the "card-sensing accumulator-activator unit V" for the "trans-space" type of machine comprises a plurality of card-pattern-registering and -rejecting elements (Fig. 15a), a portion of the general form of one of which elements is diagrammatically illustrated in Fig. 15.

The lines 340 with wavy sections indicate divisions of the element successively remote from the section otherwise more completely shown in this figure and about to be explained.

The number of these elements in a battery would be determined by the maximum number of packages likely to be placed in a container 434 for checking by the machine. Such a battery of elements would be spaced along a path to be traversed by the punched cards 170 as they are discharged from the "card punch unit VIII" and, by a suitable conveyor carried to and through the "card-sensing and accumulator-activator unit V."

Each card-pattern-registering and -rejecting element comprises a battery of photoelectric cells 316, and a single photoelectric cell 333, which are positioned to be activated by a source of illumination 302 whereby to set up electric circuits variously operating the series of solenoids 301, 303, 305–314, and 335, and 336 (see Fig. 15).

The photoelectric cells 316 and the source of illumination 302 are arranged on respectively opposite sides of the path of the punched cards 170 as they are discharged from the "card punch unit VIII," the character of which will be set forth presently. In each complete card-pattern-registering and -rejecting element there are as many of the cells 316 as there are characteristics shown in the "Table of Codes" plus the encodement for "pr," "mt" and "gr" (see Fig. 12). These cells 316 are arranged in spaced rows to conform to the spaced rows of apertures 171 and 172, as shown in the punched card 170 (see Fig. 12), so as to cause the successive individual and combination depression of the accumulator keys as herein noted. The cell 333 is offset from the cells 316 so that after a card 170 has passed the position to register apertures 171 and 172 with the cells 316 the aperture 173 is in position to register with the photoelectric cell 333. These cells 316 are directly connected to energize the solenoids 336 for switches in the booster circuits which connect with the solenoid 305–314 etc. The cell 333 is connected to solenoid 335 for a switch in a booster circuit leading to the solenoids 301 to cause the solenoids 301 to open the circuits to solenoids 308, 10, 12 etc. and prevent the registration of another card pattern.

The pairs of solenoids 305 and 306, 307 and 308, 309 and 310, etc. control switches oppositely movable into and out of contact with contact plates 332 and 332' and thereby control circuits for activating the "weight" and "price" accumulator units III and IV, and the solenoid 303 which operates the card eliminator 324, as will be explained later. The solenoids 303, 305, 307 etc., 335 and 336 are spring biased to normally hold their switches open as indicated in dotted lines. The solenoids 301, 306, 308 etc., and 330 are dual reverse coils so as to positively operate in reverse directions when energized.

As previously noted, there are as many cells 316 in each of these elements as there are characteristics on the "Table of Codes" plus "mt," "pr" and "gr." Accordingly, the cells 316 shown in Fig. 15 represent only the first five characteristics in said table which are "weight" characteristics. Inasmuch as a tracing of the circuits in a subsequent explanation of the operation of the embodiments herein shown is to be confined to the "weight indicia" for the punched card-pattern shown on cards 150 and 170 (see Figs. 26 and 12), the switches for the two upper and the two lower solenoids 336, shown in Fig. 15, and the corresponding pairs of solenoids 305 and 306, 307 and 308, 311 and 312, and 313 and 314 controlled thereby, are shown in their activated positions (i.e. closed) rather than in their normal positions.

The switches operated by the solenoids 305, 307 etc. are successively connected by a circuit 304′ to the switch as operated by the solenoids 308, 310 and 305, 307, 309 etc. except for the one of said last pair of solenoids in the complete card-pattern-registering and -rejecting element where the switch is connected to the duplication-eliminator solenoid 303. The circuit to the solenoid 303 is completed for operation by a connection 304 to solenoid 305 (see Fig. 15). The solenoid 303 may require a retarding retraction action should the progress of the cards to be ejected be too slow to coincide with the proper functioning of the plate 324.

The switches for the solenoids 306, 308, etc. and the respective switch plates 332 are connected in circuits 320 leading to the cables 342 and 343. The cable 342, through said circuits 320, connects the switches and switch plates, when activated by the photoelectric cells 316 representative of the "weight" characteristics of the "Table of Codes," with the "weight accumulator unit III." The cable 343 through similar circuits 320 connects the comparable switches and switch plates when activated by the photoelectric cells 316 representative of the "price" characteristics of the "Table of Codes," with the "price accumulator unit IV."

The solenoids 301 and 330 which are wired for reverse currents, have one coil of each in a circuit leading to the "synchronizer unit VI" to be described presently. The other coil of each of the solenoids 301 is connected in the aforesaid circuit controlled by the solenoid 335. The switches 301′ actuated by the respective solenoids 301 are connected in the respective circuits leading to the solenoids 306, 308, etc. The other coil of the solenoids 330 connects the circuits leading through the cables 341 to the contacts 361 and 362 and 361′ and 362′ on the solenoid-activated keys 360 and 360′ for the calculator 350 and the cash register 450 respectively. The switches 330′, controlled by the solenoids 330, are successively interposed in the circuits 320 which lead to the aforesaid calculator and register.

The armature for the solenoid 303 (or a pair of them), for each card-pattern-registering and -rejection element, mounts a card rejecting plate 324. Normally the plate 324 is retracted from the path of the cards passing through the battery of said card-pattern-registering and -rejecting elements, the general form of which elements has just been set forth. Following the registration of its pattern each card is ejected from the path of travel of these cards through the battery of these elements. Moreover, a duplicate pattern card is similarly rejected.

The switch plates 332′ are merely for completing circuits between the pairs of switches for the solenoids 305 and 306 etc., as the case may require, which will be made apparent later in a description of the operation of the "trans-space" machine.

The "synchronizer unit VI," for use with either of the modifications of this invention, is a type of machine long used for making and breaking power circuits for various types of mechanism. It may be brush and drum type, mercury contact type, or thermatic type. As shown in Figs. 16 and 17, either of these "synchronizer units VI" comprises a rotor 250 driven by a motor 251. On the rotor 250 are arranged elements 252 for engagement by brushes 253 connected in the circuits leading to the various parts of the mechanisms to be controlled. As hereinshown, for controlling the "trans-space" type embodiment of this invention, there are fifteen circuits consecutively numbered from C′-1 to C′-14 inclusive. For the "synchronizer unit VI" for the "mechanical" type embodiment of this invention, there are only nine circuits comparatively numbered from C-1 to C-14 with omissions of certain numbers appearing on the synchronizer for the "trans-space" type embodiment but not required on the synchronizer for the "mechanical" type embodiment.

The function of the respectively-numbered circuits controlled by either of the "synchronizer units VI" and the estimated time periods of the operation thereof are shown in Fig. 29. The numbered time periods (last right hand column) without the asterisks (*) are the periods for the "synchronizer unit VI" for the "mechanical" embodiment, the chart otherwise being an illustration for the "trans-space" embodiment.

The motor 251 for either of the "synchronizer units VI" is connected to a source of power, the circuit for which includes a switch 254 operated by the machine-activating button 2. The button 2 is shown mounted on the end of an armature for a solenoid 255. The armature when retracted is frictionally held in retracted position but returned to open the switch 254 when the solenoid 255 is energized at the end of the cycle of operation of the synchronizer unit.

The "card dock unit VII" (Fig. 25) for the "mechanical" embodiment of this invention obviously has to be different from the "card dock unit VII-a" (see Fig. 13) for the "trans-space" embodiment of this invention.

For the "mechanical" type machine the card dock unit is essentially a drawer 130 (Fig. 2) wherein the cards 150 may be stacked. The bottom of the drawer is formed with ridges which interfit with the notches 153 of the cards 150 (Fig. 3) so as to insure the proper placing of the cards in the drawer. Also, a suitable spring-pressed follower plate 131 is arranged in the front end of the drawer 130 to press and feed the cards 150 toward the rear end of the drawer 130 for discharge through the opening 133 into the "card-sensing accumulator-activator unit V." Power-driven feed rollers 162 are suitably arranged adjacent the discharge opening 133 to insure the successive delivery of the cards 150 to the aforesaid sensing means.

The "card dock unit VII-a" (Fig. 13) for the "trans-space" embodiment of this invention comprises a receptacle 140 wherein are arranged a stack of spring fed cards, blank so far as apertures are concerned, except for the aperture 173 which is pre-punched. From this receptacle the cards are fed by any conventional card feeding mechanism 217 to the "card punch unit VIII" from which, following their punching, as will be explained presently, the cards are successively delivered to the "card-sensing accumulator-activator unit V."

A fragment of the card punch unit VIII for the "trans-space" type embodiment is diagrammatically illustrated in Fig. 13. Such a card punch comprises a battery of spring-retracted, solenoid-activated punches 218, each of which solenoids is connected to a power circuit 220 controlled by an auxilliary synchronizer 211. One line of the circuit to each individual solenoid-activated punch 218 is controlled by a solenoid-operated switch 215, the solenoids for which are connected in circuits 221 each controlled by a switch 223 oppositely actuated by a pair of solenoids 212 and 213. The solenoids 212 are connected in parallel to a circuit 219 controlled by the auxilliary synchronizer 211. The solenoids 213 are connected in circuit with the solenoid 213' operating a switch for controlling the circuit to the motor 214 for the auxilliary synchronizer 211 and through circuits in the cable 210 to the "shadow activator unit XI."

The auxilliary synchronizer 211 is also arranged to control a circuit 216 to the motor-driven card feed 217 in the "card dock unit VII-a" and a circuit 219 to reset the solenoids 212 and 212'.

It should be noted that there is a card punch element 218 and an activating solenoid-control circuit 221 for each of the characteristics shown on the "Table of Codes," and for the three store departments "gr.," "mt." and "pr." Fig. 13 shows only the punches 218 for the first five characteristics for the "Table of Codes." The other punches 218 would extend on from those shown. These punches are relatively positioned to punch rows of apertures 171 and 172 as shown in the card 170 in Fig. 12.

Inasmuch as the operation of the "card punch unit VIII," as just described, is controlled by a "ray (or wave) actuated unit XI" as influenced by rays (or waves) emitted from "ray-producing (or wave-producing) unit IX" which rays (or waves) are intercepted and have their character influenced by indicia on the container goods between the ray-producing and the ray-detector means, it will contribute most toward an understanding of the structure and operation of the "trans-space" embodiment of this invention if these units are now described beginning with the ray-producing unit and following in sequence with the description of the other aforesaid units.

The "ray-producing unit IX" (Figs. 5 and 6) shown in this particular embodiment of the "trans-space" machine is a conventional roentgen or X-ray device used to create shadows of the rings 110 and the globule III embedded in the index tabs 100. These rings and globule shadows are picked up by the "shadow-detector unit X" and transmitted to the "shadow-activator unit XI" for actuating the "card punch unit VIII." It will be understood, however, that other forms of space-transmitted rays or waves—such as, for example, alpha, beta, gamma rays or sound waves—and appropriate units for their production and detection may be substituted for the roentgen ray equipment about to be described.

As herein shown (Fig. 6) the roentgen lamps 66 and a grid 67 and a screen 71 and magnifying lens 72 are arranged on opposite sides of the platform I. These pairs of parts are sufficiently spaced to permit the tilting of the platform I with the container 434 thereon, as has been previously noted and as will be referred to again in explaining the operation of the machine. The rings in the tags 68, 69 and 70 on the container articles will cast shadows 60, 61 and 62 (see Fig. 6) on the fluorescent screen 71 and onto the lens 72 which will project the magnified ray definition of such shadows out into space to be picked up by the "shadow-detector unit X."

The "shadow-detector unit X" (Figs. 6 and 8, 33–35) comprises a plurality of detector elements 49 mounted on a pair of uprights 51 slidably supported in sleeves 50' on a carriage 50 mounting wheels for traveling on a track 56 on a frame 65. Pairs of arms 63 hinged together at 74 and anchored to the frame 65 and to one of the uprights 51, guide the reciprocation of shadow detector elements under the action of suitable motor means (see Fig. 33).

At their lower ends, below the carriage 50, the uprights 51 are connected with a bracket 52 which mounts a flanged wheel 53 arranged to traverse a winding track 55 (see Figs. 8, 33–35). These oppositely-connected parallel tracks 55 are so formed that coincident with each reciprocation of the "shadow detector unit X" it is successively moved downwardly a predetermined distance. There will result a scanning of the entire area over which the defining rays of the indicia shadows may be cast and, in the course of a complete cycle of operation of the machine, insure a proper registration of every effectively-positioned indicia shadow with one of the detector elements 49. This guarantees that, in the course of multiple scannings, every index tag on the goods in the container 434 will properly effect the operation of the machine incident to issuing a complete itemized and totalized sales check. The amount of lowering for each transverse trip of the "shadow detector unit X" would be accommodated to the "module" (magnified or otherwise) of the rings 110, indicated in the "Table of Codes" hereinbefore shown. This "module," or measurement, would be the working dimension, magnified or otherwise, between the image rings on the tag 100 (see Fig. 10) or the diameter of the photoelectric cells used in the "shadow detector unit X." However this dimension might have to be modified to meet circumstances it would be such that, in any event, the "shadow detector unit X" would pick up the shadows in such a manner as to appropriately effect the operation of the other units hereinafter described.

As hereinshown, there are 6 of these shadow detector elements 49. Three are arranged on each of the uprights 51 and, as will be apparent from Figs. 6 and 8 the ones on one upright are staggered with respect to those on the other upright. However, this number and arrangement obviously may be modified, as the most effective operation of the machine may dictate the need for so doing.

The general character of each shadow detector element is diagrammatically indicated in Fig. 9. Each is in the form of a disk having 16 radial rows 101 of photoelectric cells circumferentially spaced. At the center of the disk is a pair of concentrically arranged areas, within the inner of which are a pair of photoelectric cells 102. In the outer of these concentric areas are arranged a number of photoelectric cells 103 connected in series. Photoelectric cells 102, when shadowed by the center globule III on an index tag 100, enables the shadows cast by the rings 110, when properly positioned on the shadow detector element, to initiate the operation of the "shadow activator unit XI" as will be explained later. The photoelectric cells 103, when activated by any part of a shadow of an index ring 110, serves to completely "neutralize" the functioning of the "shadow activator unit XI" for any ring shadows which may be improperly oriented on said shadow detector unit, as also will be explained later.

It should be noted here that tag-ring shadows cast on the screen 71 will be in the form of concentric circles or ellipses, or a straight line depending upon the angularity of the tag axis to the plane of the screen 71. For a shadow to be effectively picked up by a shadow detector element it must be elliptical with the short diameter greater than a predetermined minimum. It is presently estimated that such a minimum will be obtained if the tag axis is no more than 30 degrees off from a normal to the plane of the screen 71. It should be noted further that only the maximum diameters of these ring shadows represent the "characteristics" of the "Table of Codes" and are effective in securing the intended functioning of the machine, as will be explained later.

Circuits lead from the photoelectric cells in the radial rows 101 and from the concentrically arranged photoelectric cells 102 and 103 to solenoids forming a part of the "shadow activator unit XI." Between the concentrically-arranged cells 102 and 103 and the innermost cells in the radial rows 101 is a concentric inactive area 112.

The "shadow activator unit XI" in effect is a battery of circuit makers which energize circuits leading to and effecting the requisite operation of the "card punch unit VIII." Such an activator unit is herein shown (see line 14—14 Fig. 11) diagrammatically as a vertically-shiftable disk divided into as many insulatedly-separated sectors as there are radial series 101 of photoelectric cells in one of the shadow detector elements 49 of Fig. 9. Each sector is segmented to correspond with the number of photoelectric cells in each such radial series. The segments on one of the diametrically opposed sectors are formed of two sections insulated from each other, as indicated at 200 in Figs. 11 and 14. The diametrically opposed segment is one piece as indicated at 201 in Fig. 11 and 14. Obviously, adjacent segment sections 200 and 201 are electrically insulated from each other. One section of each of the two section segments 200 is connected by a circuit 205 to the corresponding diametrically opposed segment 201 (see Fig. 14).

Below each segment 200 and 201 is arranged a solenoid-actuated armature 204 or 204' (see Fig. 14) each pair of which, is capable of effecting a vertical shifting of the disk when they are simultaneously energized by reason of their being the diametrically opposite points of the shadow of maximum diameter in a group of concentric shadows cast on a shadow detector element 49.

As will be noted from Fig. 14, the solenoids for the pair of armatures 204—204' are arranged at successively higher levels from the innermost pair to the outermost pair. The vertical movement of each armature being limited, this means that when one pair of diametrically opposite armatures 204—204' have contacted and lifted the disk, simultaneously-actuated armatures 204—204' inwardly thereof will not be able to contact the floating disk. However, their closing of circuits to the "card punch unit VIII" is effected through one or more brush contacts 224 and 224' so positioned as to be engaged by the respective armatures in their elevated positions. The diametrically opposite brush contacts are connected in series and through a cable 210 with the circuits that lead to the "card punch unit VIII."

In Fig. 14 there is one of these brush contacts 224—224' for the outermost armatures 204—204' and five for the innermost armatures. This figure as noted above, is only a portion of the complete unit. Hence, in the complete unit the outmost pair of armatures each would have one such brush contact, whereas the innermost pair of armatures each would have as many associated therewith as there are cells in a row of cells 101 (see Fig. 9). The brush contacts for the intermediate armatures are correspondingly graduated in number as indicated in Fig. 14.

By this arrangement of brush contacts 224—224', the pairs of armatures 204—204' activated by the shadows of diameters less than the one of maximum diameter would have their circuits to the "card punch unit VIII" closed simultaneously and coincident with the closing of such circuit by the armatures 204—204' activated by the shadow of maximum diameter.

The solenoids for the corresponding diametrically-opposed armatures 204 and 204' are connected in series with switches 206 and 206' in a circuit 207, said switches 206 and 206' being operated by solenoids 208 and 208' connected in series and through the cable 209 with photoelectric cells in the corresponding radial series 101 of the photoelectric cells for all of the shadow detector elements 49.

The solenoids 202 and 203, which respectively operate normally-open and normally-closed switches 202' and 203' in the circuit connecting the opposite solenoids 208 and 208', are connected to the photoelectric cel's 102 and 103 respectively of the several shadow detector elements 49. The positions of the switches 202' and 203' determine the readiness or unreadiness of the solenoids 208 and 208' to respond to the activation of the corresponding photoelectric cells in the shadow detector elements 49, so as to condition the circuit 207 through the switches 206 and 206' and thereby communicate to the solenoids 213 of the hereinbefore-described "card punch unit VIII," the activation of the photoelectric cells of any one of the elements 49 of the "shadow detector unit X."

Obviously, a housing 1 is required for either type of machine, wherein the several units above described are appropriately enclosed.

Figure 2:
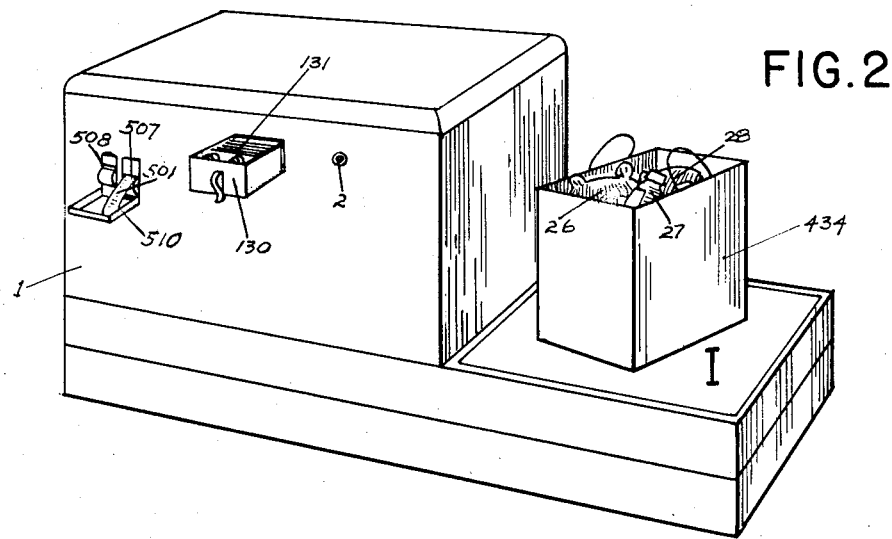
Fig. 2 is a perspective view of a form of housing suitable for use with "mechanical" recording type of machine embodying this invention, a container of goods being shown positioned on the container platform.

For the herein-illustrated "mechanical" embodiment of this invention the housing 1 is shown L-shaped (Fig. 2) with the container platform I fully exposed for placing thereon a container 434. For the purpose of simplification, Fig. 2 shows only three articles in the container, respectively designated 26, 27 and 28. The drawer 130 ("card dock unit VII") is mounted to be shifted into and out of the housing I to locate the card discharge opening 133 (see Fig. 25) in operative relationship with the card feed mechanism 162. A suitable contact switch (not shown) would be arranged in the machine-starting C-1 circuit (see Fig. 17) to be normally open when the drawer 130 is retracted but closed when the drawer is pressed into its closed position.

The starting button 2 is arranged adjacent the drawer 130. Suitable housing slots 5 and 6 are arranged for the issuance of the sales check 501 or the "See Mgr." slip, as determined by the operation of the "weight verifier unit II."

Figure 5:
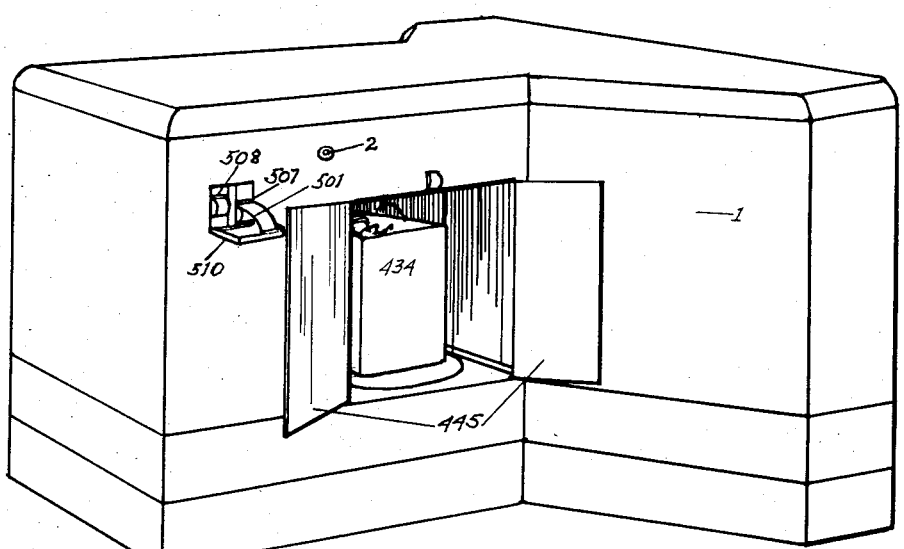
Fig. 5 is a perspective view of a form of housing believed to be suitable for the "trans-space" recording type of machine embodying this invention, a container of goods being positioned on the platform therein preparatory to having the same automatically checked for issuance of a sales check.

The housing 1 for the herein shown "trans-space" embodiment of this invention, because of the contemplated arrangement of the mechanisms required for its effective operation, simulates a T, as is more clearly indicated in Fig. 5. Within the stem part of the T-shaped housing is arranged the container platform I, whereon is to be placed the container 434 of goods to be ultimately checked, and the other units arranged on opposite sides of the platform. Suitable doors 445 are provided which of necessity are so connected to the "synchronizer unit VI" as to be locked in their closed position during the operation of the machine. Since this particular embodiment contemplates the use of roentgen rays, the housing 1 is lead-lined throughout, as is customary with the commercial X-ray machines now extensively employed for visual inspection for all sorts and kinds of food products, pharmaceuticals, and industrial products and equipment, so as to protect users of the machine against any possible exposure. Fig. 6 diagrammatically indicates the general arrangement of the several units hereinbefore described which are enclosed in the housing 1.

The starting button 2 and the sales check and "See Mgr." strip slots 507—508 are appropriately arranged adjacent the doors 445.

*Operation*

The operation of either of the herein shown embodiments of this invention obviously is predicated on the use of a standardized, conveniently-handleable container 434 designed to hold the maximum number of articles likely to be purchased at any one time. The "weight verifier unit II" necessarily would be adjusted to compensate for the weight of such a standard container.

The purchaser would go about the store with the container 434, as is now the practice, and place the selected articles in the container. At the completion of such shopping the customer would bring the container of articles to the check out station, at which there would be located one or more of the machines embodying this invention.

In order to simplify the explanation of the operation of either type of machine herein shown, the cards 150 and 170 shown in Figs. 3 and 12 are shown punched for a specific article of merchandise, namely, a piece of steak weighing 41.10 ounces (2 lbs. 9.1 ozs.) and priced at $2.75. That involves a card 150 or a ringed tag 100 (for subsequently punching an index card 170) indexed for the following combination of characteristics from the "Table of Codes":

| | Weight, ounces |
|---|---|
| I | 25.60 |
| H | 12.80 |
| E | 1.60 |
| D | .80 |
| B | .20 |
| A | .10 |
| Total | 41.10 |

| | Price |
|---|---|
| S | $2.56 |
| O | .16 |
| L | .02 |
| K | .01 |
| Total | $2.75 |

With a view to facilitating an understanding of the operation of either type machine, the "weight" characteristic circuits when specifically referred to and/or shown in the drawings are confined to the "A," "B," "D" and "E" characteristics of the foregoing example.

When the "mechanical" type machine is used the cards 150 would be disassociated from the articles by the purchaser as they were placed in the container. Upon reaching the check-out machine the customer would place the basket on the "platform I" and insert the disassociated cards 150 in the drawer 130 in front of the spring-pressed follower 131 (Fig. 2) with the notches 153 in registration with corresponding ridges in the drawer bottom. The customers will have to understand that a card 150 for each article placed in the container 434 will have to be put in the drawer 130 if there is to be the anticipated issuance of a sales check.

The cards 150 being placed, the drawer 130 would be pushed into the housing 1, whereupon the operator would press the button 2, which would initiate the operation of the machine. In a few seconds the machine would issue either an itemized and totalized sales check 501 or a "See Mgr." slip, depending upon whether or not there was or was not an accord—within the tolerances provided—between the actual weight (in this type of cross check) of the goods registered by the "weight verifier unit II" and the indexed weight communicated through the "weight accumulator verifier-control unit III" by the processing of the perforate cards 150 by the "card-sensing accumulator-activator unit V". The sequence of operation of these several units would be as follows:

The engagement of the drawer with a control switch (not shown) for the circuit C-1 (Fig. 17) would be closed. The pushing of the button 2 would close the switch 154, thus putting the motor 251 for the "synchronizer unit VI" into operation. Because of the friction contact with the solenoid 255 the switch button 2 would remain in its retracted position until the end of the cycle of operation of the "synchronizer unit VI."

The starting of the synchronizer motor 251 would result in the practically simultaneous closing of the circuits C-3, C-5 and C-6 (see Figs. 17 and 29). Closing of the circuit C-3 results in unlatching the platform 1 to permit it to function. Closing of the circuit C-5 results in the card-feed mechanism 162 feeding the cards through the "card-sensing accumulator-activator unit V." Closing the circuit C-6 effects the illumination of the lamp 160.

Instantly, upon the unlatching of the platform I, the container 434 causes the weight indicator contactor 431 of the "weight verifier unit II" (Fig. 22) to rotate and move the "accord" contact 432 to a position relative to the commutator 430 indicative of the actual weight of the goods in the container 434 on the platform I. In Fig. 22, the contactor 431 is shown with the center line of its supporting bar registering with the commutator segment representative of 02.60 ounces, which is one tenth of an ounce off from the sum of the "weight" characteristics "A," "B," "D" and "E" (02.70) of the specific example hereinbefore chosen for use in following through the operation of these embodiments.

As the edge of a card 150 contacts the knob 166 for the switch 154 the latter is opened and held so until the advance of the card 150 brings the first of the three notches 153 into registration with the switch knob 166. Thereupon, the circuit 155 to the photoelectric cells 156 and the solenoid-operated swtiches 161 is closed. As this occurs, the apertures 151 (on the exemplar card, Fig. 26) for the characteristics "A," "B," "K," "L," "D," "E," and "O" are brought into registration with the corresponding photoelectric cells 156. These cells become activated, causing the energization of the corresponding solenoids 161, closing the switches to the similarly lettered circuits as shown in Fig. 27.

As the card 150 is advanced, the switch 154 is momentarily opened and then immediately closed as the switch knob 166 recedes from the first card notch 153 and enters the second. At the latter moment, the apertures 151 for the characteristics "H," "I" and "S" for the exemplar card shown in Fig. 26 are brought into registration with the corresponding photoelectric cells 156, resulting in a closing of the switches for the corresponding solenoids 161. As the switch knob enters the third notch 153, the department aperture 152 ("mt." on the exemplar card of Fig. 26) effects the actuation of the solenoid 161 for closing the switch for the corresponding circuit. In Fig. 27 the switches actuated by the solenoids 161 energized by the above-described exemplar card 150 are shown closed for the purpose of indicating completed circuits to the units the operation of which is now to be explained.

The series of cards 150 are thus processed and discharged in the course of a few seconds of time.

The closing of the switches by the solenoids 161, representative of the aforesaid "weight" characteristics is communicated through cable 342 to the "weight accumulator verifier-control unit III" (Figs. 18, 19 and 20). The closing of the switches by the solenoids 161 representative of the "price" characteristics of the aforesaid exemplar card is communicated through cable 343 to the "price accumulator and check-issuing device unit IV" (Figs. 23 and 24).

As the above card circuits for the characteristics "A," "B," "D" and "E" are closed, solenoids 351 (Fig. 19) are activated to simultaneously depress the weight accumulator keys 360 for .10, .20, .80 and 1.60 (total 02.70) ounces. The concurrent closing of the circuits by the solenoids 161 representative of the "price" characteristics "K," "L" and "O" results in an energization of the solenoids 351' for the cash register 450 (Figs. 23 and 24) so as to cause the depression of the keys 360' for $.01, $.02 and $.16.

The instantly-subsequent closing of the circuits by the solenoids 161 representative of the "weight" characteristics "H" and "I" results in an energization of the solenoids 351 for the calculator 350 so as to cause the corresponding platens 354 to simultaneously depress the keys 360 for the "tens" key "I," the units key "2," and the "tenths" key "8" to total 12.80 ounces and the "tens" key "2," the "units" key "5," and the "tenths" key "6" to total 25.60 ounces. Simultaneously with the closing of the solenoids 161 representing the "H" and "I" "weight" characteristics the solenoid for the "S" "price" characteristics is also activated so as to cause a depression of the combination of cash register keys for $2.56 (total price $2.75).

As each cash register key 360' is depressed, the engagement of the contacts 361' and 362' (Fig. 28) results in a closing of the circuit to one of the coils of the solenoid 361' for the motor bar 460 whereupon each "characteristic" amount as it is "keyed" on the cash register 450 is printed on the conventional paper strip and is set up on the register by the conventional mechanism for subsequent printing of a total on the sales check and a registration thereof on the machine's permanent record, As the "answer" wheels 405 of the calculator 350 are turned by the depression of the keys 360 the gearing 404 (Fig. 30) rotates the commutators 401 sufficiently to bring the corresponding contacts 406 and brushes 403 into engagement. Corresponding circuits are thereupon closed to the switchboard "Z" until the accumulating total weight of the exemplar card is registered on said switchboard. The circuit for this accumulation of the characteristics "A," "B," "D" and "E" is shown in heavy lines in Fig. 21, which incidentally constitutes a total of 2.70 ounces.

As the "weight" characteristics are successively registered on the calculator 350 and transmitted to the switchboard "Z" they are communicated to the respective segments of the commutator 430 of the "verifier control unit II" following the closing of the solenoid switch 374 by the synchronizer VI. If the accumulated weight thus communicated to the verifier is within the tolerance range of the contactor "accord" segment 432 the circuit 439 (Fig. 22) will be prepared for completion subsequent to a closing thereof by the "synchronizer unit VI" so that a sales check 501 will issue, as will be explained presently. If, however, the accumulated weight communicated to the verifier from the calculator 350 is out of the tolerance range of the contactor "accord" segment 432—hence, obviously in the range of the "disaccord" segment 433—the circuit 439' (rather than the circuit 439) will be prepared for the subsequent closing by the "synchronizer unit VI" so that the cash register 450 will be operated to "total and subtract" the sum of the depressed keys 360' and issue a "See Mgr." slip rather than a sales check 351, as will appear presently.

It will be understood, of course, that the actuation of the keys for the calculator 350 and the cash register 450 take place simultaneously as the cards 150 are processed through the card sensing mechanism. Also, it should be noted that the "synchronizing unit VI" is set for a time cycle of operation required for the maximum number of cards that are likely to be processed for any one container of goods.

As the "synchronizer unit VI" approaches the end of its cycle the circuits C-12, C-13 and C-14 are closed. The closing of the circuit C-12 energizes the solenoid so as to close the two-pole switch 429 (see Fig. 22) and also the solenoid switch 374. Assuming normal operation of the machine this completes the "accord" circuit 439 to energize the proper coil of the solenoid 471 (see Fig. 24) so as to shift the indicator 470 to set the cash register mechanism for a "totaling" operation. The closing of the circuit C-13 causes the energization of the proper coil of solenoid 351' to depress the motor bar 460 to effect the "totaling" operation of the register 450 and the advance of the "sales check" 501 through the slot 507. Simultaneously the "See Mgr." slip is advanced against and deflected by the door 503 (see Figs. 24–a, 24–b, and 24–c). The closing of the circuit C-14 results in energizing the solenoid 509 to depress the knife 504 and sever both the "sales check" 501 and the "See Mgr." slip. The former falls onto the tray 510 (see Fig. 2), the latter remains in the machine housing. If, perchance, at the completion of a processing of the cards 150, the "weight verifier unit VI" registers a "disaccord" with the indicated weight of the indicia cards that were processed, the closing of the switch 429 will result in the circuit 439' (rather than the circuit 439) being completed, with the consequence that the solenoid 506 (Fig. 24–a) will be energized. This will cause a rocking of the walking beam 505 resulting in a reversal of the positions of the doors 502 and 503 (see Figs. 24–a, 24–b, and 24–c). Simultaneously, the proper coil of the solenoid 471 will be energized so as to cause a shifting of the indicator 470 to gear the register 450 with a "total and subtract" mechanism (see Fig. 24). Thereupon the subsequent closing of the synchronizer circuit C-13 will cause an operation of the motor bar 460 resulting in the items previously accumulated on the register 450 being totaled and immediately subtracted. This will neutralize the register's permanent record. This action will also result in the strip-feed advancing the sales check 501 and the "See Mgr." slip. However, this time the latter will emerge from the slot 508 whereas the former will advance against and be deflected by the door 507 to remain in the machine. The closing of the synchronizer circuit C-14 will activate the solenoid 509 to depress the knife 504 and sever the above-printed check and slip.

When the "trans-space" embodiment of this invention is used, the purchaser does not disturb the tags 100 but simply places the selected articles promiscuously in the container 434, in utter disregard of the tags. Of course, each purchaser will have to understand that every article or group of article selected and placed in the container 434 must have a tag attached thereto in order to result in an effective operation of the machine.

Upon completing the purchases and arriving at the check-out station, the purchaser opens the doors 445 and places the container 434 on the platform I. After properly closing the doors, the purchaser pushes the button 2, whereupon the operation of the machine is initiated.

In order to make most simple the following through of the cycle of operations initiated by the pushing of the button 2 and resulting in the issuance of a sales check or "See Mgr." slip, the subsequent explanation is confined to the action as it relates to the four rings "A," "B," "D" and "E," of the "example" hereinbefore tabulated, and a center globule III, which rings and globule are shown in completed circles in Fig. 10. The ring corresponding with the "C" "characteristic" of the "table of codes" is purposely omitted in order to accentuate the explained action of certain parts of several of the mechanisms whose respective operations are dependent upon the proper pick-up of the shadows of the rings by the "shadow detector unit X."

The first action resulting from a pushing of the button 2 is the starting of the "synchronizer unit VI" (Fig. 16) as previously explained for the "mechanical" type embodiment. The practically simultaneous closing of the circuit C'-2, C'-3, C'-5 and C'-6 respectively results in the locking of the doors 445, the unlocking of the platform I, the starting of the card-feeds 217 and 326 to discharge cards from the "card-dock unit VII–a," and move them through the card-sensing mechanism, and the illumination of the lamp 302 for the "card-sensing accumulator - activator unit V." In quick succession thereafter circuits C'-4 and C'-7 are closed to energize the X-ray lamp 66 and start the reciprocal scanning of the "shadow detector unit X."

Through the instrumentality of the grid 67, screen 71, and the magnifying lens 72, magnified shadows of the tag rings "A," "B," "D" and "E" will be cast in the path of the "shadow detector elements 49." Regardless of position, these will always project as lines, circles or elipses, thus presenting a full diameter as the maximum dimension at all times. (See shadows 60, 61, and 62 of the tags 68, 69 and 70 represented on the screen 71). The "shadow detector unit X" moves back and forth in a plane parallel to the screen 71 and drops down one module or dimension for each traverse of the screen 71.

Shadow detector elements 49 will be activated by tag ring shadows only when (1) the shadows are not less than elliptical and with the axis thereof inclined not less than 30 degrees to a normal to the plane of the reciprocal movement of the respective shadow detector element 49, and (2) the shadow of the globule III in registration with the photoelectric cells 102, and no interruption occurs in neutralizing ring 103.

For the purpose of indicating how these shadows effect the operation of the other mechanisms, Fig. 9 shows shadows of the rings "A," "B," "D" and "E" (Fig. 10)

and the shadow of the globule III in effective position. These shadows are respectively identified as 104, 105, 106, 107 and 108. Because the shadow of the globule III is in registration with the photoelectric cells 102, the circuit to the solenoid 202 (Fig. 14) activated so as to close the normally-open switch 202′ for the circuit leading to the solenoids 208—208′. There being no interruptions registered by solenoids 103—switch 203 remains closed and uneffected by action from solenoid 103. Thereupon, the maximum diameters of the aforesaid ring shadow across the diametrically opposite photoelectric cells activate these photoelectric cells to close the circuits to the respective solenoids 208—208′, whereupon circuit 207 is closed to the corresponding solenoids for armatures 204—204′. It is to be noted correspondingly that any registration less than a maximum diameter is not permitted to become effective because of the construction of the instrument. As indicated in Fig. 14, the armatures 204—204′ for the shadow 107 of major diameter (see Fig. 9) are activated to move up into contact with the corresponding segments 200 and 201 of the floating disk and raise it out of reach of all the armatures inwardly thereof. In this Fig. 14, the armatures for the solenoids representative of the characteristic "A" of the "Table of Codes" are shown in actual contact with the segments 200 and 201 and the armatures for the solenoids representative of the characteristics "B," "D" and "E" are shown positioned to engage the brushes 224—224′. This results in a closing of the circuits which lead to the corresponding solenoids 213 and the solenoid 213′ of the "card punch unit VIII" (see Fig. 13). Energization of the solenoid 213 and the solenoid 213′ results in closing the corresponding normally-open switch 223, thereupon starting the motor 214 for the auxiliary synchronizer 211 and closing the circuits 221 to the solenoids 215 for switches in the circuits to the respective punch solenoids 218 controlled by the synchronizer 211. In Fig. 13 all of these normally-open switches for the "Table of Codes" characteristics "A," "B," "D" and "E" are shown closed as being influenced by the shadows 104, 105, 106 and 107 (Fig. 9). The circuits to the respective punch solenoids 218 being closed, the auxiliary synchronizer 211 closes circuit 220 to these punch solenoids 218, resulting in a punching of a card 170.

It will be noted that since there is no ring in the tag 100 to represent the characteristic "C" of the "Table of Codes," there is no shadow cast on the shadow detector element shown in Fig. 9. Consequently, there is no activation of the diametrically opposite solenoids for the armatures 204 and 204′ representative of the characteristic "C" in the "Table of Codes," hence no activation of the "C" punch 218. Fig. 12 shows a card with four black dots for these four characteristics punched therein, which is part of the "example" hereinbefore tabulated.

As the shadow detector elements 49 move across and down the screen 71, the shadows of all article tags in the container 434, which conform to the hereinbefore-mentioned position requisites, will result in the punching of the pattern thereof in a card 170. To secure an accord between the total actual and indicated weight of the articles in the container 434 a pattern for every article tag must be recorded on a card 170. Any tag which casts shadows not conforming to the hereinbefore-mentioned position requisites will not be picked up by a shadow detector element 49. Consequently, no pattern for the tag on that particular article will be punched in a card 170. Such cases might be shadows or group of shadows constituting straight lines, shadows with their axis less than 30 degrees to the normal to the plane of the screen 71, and/or one shadow pattern behind another yet of different maximum diameters and both showing coincidental central globule shadows. Obviously, it therefore becomes necessary to re-position the container 434 with the articles so that any tags, which, on the first scanning of the "shadow detector unit X," did not produce the requisite-positioned shadows, may be so adjusted that upon a second scanning by the "shadow detector unit X" the ring shadows of such tags may be in requisite position. Hence, through the closing of the synchronizer circuit C′–8 the motor 42 (see Fig. 7) will be energized as soon as the "shadow detector unit X" has completed its first scanning. This will result in a turning and tilting of the platform I so as to alter the angularity of all tags of articles in the container 434 to the plane of the screen 71, and obviously, to the plane of the movement of the "shadow detector unit X." As soon as this rotation and tilting is completed, the "shadow detector unit X" will be activated again so as to re-scan the screen 71. This "synchronizer unit VI" can be arranged so that there may be a third rotation and tilting of the platform I, if that is discovered necessary to secure an effective operation of the machine.

As a result of each scanning by the "shadow detector unit X" all requisitely-positioned shadows will result in the punching of cards 170 to record the patterns indicated by the shadows. As soon as each card 170 is punched, a suitable conveyor (not shown) delivers it to the card-pattern-registering and -rejecting elements for the "card-sensing accumulator-activator unit V" (Fig. 15).

The operation of one of these card-pattern-registering and -rejecting elements is indicated in Fig. 15. This view shows a card 170 in position between the source of light 312 and the series of photoelectric cells 316, representative of the "characteristics" of the "Table of Codes," and the special photoelectric cell 333. As will be apparent from the illustration, the photoelectric cells 316, corresponding to the weight "characteristics" of the exemplar card herein shown, are activated. This results in the corresponding pairs of solenoids 305 and 306, 307 and 308, 309 and 310, etc. shifting their respective switches into contact with the respective contact plates 332. Such action closes the circuit 304—304′ to the solenoids 303, whereupon each card ejector plate 324 is shifted into the path of the card 170 to effect its discharge as it leaves the element whereon its perforate pattern has been registered.

The contact of the switches with the respective plates 332 for the "weight" characteristics results in a closing of the circuits through cable 342 to the weight accumulating calculator 350 and for the "price" characteristics results in a closing of the circuits through the cable 343 to the cash register 450 in exactly the manner hereinbefore traced out in explaining the operation of the "mechanical" embodiment of this invention.

As the card 170 continues its movement, and before it passes completely beyond the card-pattern-registering and -rejecting element, light through the aperture 173 activates the photoelectric cell 333. This results in all of the solenoids 301 for that particular element being activated. These solenoids 301 open the circuits 320, which, as just explained, have resulted in an actuation of the "weight" and "price" accumulator keys. The circuits 320 remain open until the solenoids 301 are oppositely activated by the C′–11 circuit of the "synchronizer unit VI," which will not occur until the entire batch of cards has been processed and the machine has issued the sales check 501 or the "See Mgr." slip.

As a card 170 moves on, after having activated the accumulators and the solenoids 301, it meets the ejector plate 324 and is discharged from the machine.

Any one of the card-pattern-registering and -rejecting elements having once been activated to cause the actuation of a certain set of accumulator keys will never be activated again, during that cycle of operation, by a card having the same pattern, for the reason that an activation of the photoelectric cells 316 will not close the accumulator circuits 320 because such circuits have been inactivated by the activation of the solenoids 301.

Thus, in the course of processing a batch of cards bearing patterns resulting from the several scannings incident to a single operation of the machine, the accumulators will be actuated to register but one pattern, all duplicate patterns being ineffective to cause the actuation of the accumulators.

After the final scanning by the "shadow detector unit X" and all of the card patterns have effected the operation of the "weight" and "price" accumulators, the "synchronizer unit VI" through circuits C'-10 and C'-11 will respectively reverse the solenoids 373 of the switchboard "Z" and the solenoids 301 and 330, and solenoids 306, 308, 310 etc. Reversing the solenoids 373 retracts the switch contact elements 371. Reversing these solenoids 306 etc. restores all of the card-pattern-registering and -rejecting elements to their normal positions for subsequent activation.

If, perchance, a tag 100 for one of the articles has been dislodged from the article placed in the container 434, there would be no shadow cast for the "shadow detector unit X" to pick up. Hence, no card would be punched. No card pattern being established for that article, the "indicated" weight thereof would not be registered through the "weight accumulator unit III" on the "weight verifier unit II." As a consequence, the "indicated" weight of all the articles in the container would be materially less than the tolerance allowed for by the "accord" segment 432 for the registered weight. This would result in the "synchronized unit VI" closing the circuit 439' which would caused the issuance of a "See Mgr." slip instead of a sales check 501. The customer receiving such a "See Mgr." slip of necessity would have to confer with a store personnel who would seek to discover the reason for the discrepancy between the registered and indicated weights. The store personnel would thereupon inspect the goods to see whether any tags were missing or defective. If none were missing the personnel could effect a re-operation of the machine unless other circumstances seemed not to warrant, or the personnel could check the articles in the manner now followed and consummate the transaction.

It should have been noted from the foregoing that where solenoids are not operated by currents through reverse coils, they are spring biased to their normal retracted positions.

Variations and modifications in the details of structure and arrangement of the parts may be resorted to within the spirit and coverage of the appended claims.

I claim:

1. In a machine of the class described, the combination of a motor driven register adapted to issue either a visual record of the composite price characteristic common to a selected group of goods or an alternative visual record, a platform for receiving a container of said selected goods with each of which has been associated a card perforated to indicate the price and weight characteristics of the respective goods, a perforate-card-sensing mechanism, a weight indicator operated by said platform for registering the actual composite weight of said container goods, electrical means connecting said register with said sensing mechanism and said weight indicator and coordinated to condition the operation of said register to issue the price record or the alternative record depending upon the accord or discord between the weight indicated by said indicator and said sensing mechanism, and means for receiving the cards disassociated from said container goods and operable to position said cards to activate said sensing mechanism.

2. In a machine of the class described, the combination of a register adapted to issue a visual record of the composite price characteristic common to a selected group of goods or a substitute for such a record, a platform for receiving a container of said selected goods with each of which has been associated a perforated card to indicate the price and weight characteristics of the respective goods, a perforate-card sensing mechanism, a weight indicator operated by said platform for registering the actual composite weight of said container goods, electrical means connecting said register with said sensing mechanism and said weight indicator, means for receiving the cards disassociated from said container goods and operable to position said cards to activate said sensing mechanism, and means connected to said weight indicator and said sensing mechanism and activated by an agreement between the composite sensed weight and the weight indicator of said container goods to permit the issuance of said price record but activated by a discrepancy between the composite sensed weight and the weight indicator of said container goods for operating said register to issue said substitute record.

3. In a machine for issuing an itemized and totalized price record of a miscellaneous selection of goods with each of which is associated indicia means representative of the respective price and weight characteristics, a price register equipped to issue said price record or a substitute therefor, means for indicating the actual total weight of said selection of goods connected to said price register to ultimately control the issuance of said price record or said substitute, a weight computing register connected to coact with said weight-indicating means in controlling the record-issuing action of said price register, and sensing means connected to said price and weight registers and adapted to be activated by the selected goods indicia for accumulating on the respective registers the price and weight characteristics of said selection of goods whereby an accord or discord between the weight-indicating means and said weight-computing register determine the record-issuing action of said price register.

4. In a machine of the class described, the combination of a register-operated means for issuing a visual record of the computed total of one of two characteristics common to a certain variety of goods, a platform for positioning on said machine a container of a miscellaneous selection of said goods with each of which has been associated ray-influencing indicia of said two predetermined common characteristics, means operated by said platform for registering the actual composite of the other of said two container-goods characteristics, ray-influencing and ray-receiving means arranged adjacent said platform to interpose said container of goods, indicia-recording means activated by said ray-receiving means, and sensing means coacting with said indicia-recording means and coordinated with said platform-operated means for controlling said register-operated means to effect the issuance of said visual record.

5. A machine for issuing a printed summation of one of two characteristics common to a miscellaneous selection of individually-packaged goods each having thereon indicia of the two predetermined common characteristics of the goods, the machine comprising, a platform for positioning the selected goods on the machine, an indicator actuated by the platform for directly registering the summation of one of the selected-goods' common characteristics represented by one of the indicia, registers for respectively accumulating thereon the two indexed common characteristics of the selected goods, one of the registers being adapted to issue a printed summation of its accumulations of the other goods' indexed characteristic, a sensiferous indicia record producing means, indicia-sensing mechanism connected to the record producing means and arranged adjacent to the platform in position to sense the indicia on the goods positioned in the platform, a record-sensing mechanism interposed between the recorder and the registers for sensing the records produced by the record producing means and effecting the summating operation of the respective registers, coordinated means activated by the other register and the platform indicator for releasing or restraining the issuance of the printed summation from the one register depending upon substantial agreement or disagreement between the platform-indicator summation of the goods' one characteristic and summation of the goods' same characteristic on the other register, a synchronizer connected to effect the appropriate sequential operation of the sensing mechanisms, the recorder, and the registers, and means for initiating the operation of the synchronizer.

6. A machine for issuing a printed summation of the prices of a miscellaneous selection of individually-packaged goods each bearing thereon indicia of the price and weight characteristics of the respective goods, the machine comprising, a scale for positioning the selected goods on the machine and indicating the total weight of the goods, registers for respectively accumulating the price and weight characteristics of the selected goods, one of the registers being adapted to issue a printed summation of the prices of the selected goods, a price and weight sensiferous indicia record producing means, indicia-sensing mechanism connected to the record producing means and arranged adjacent to the platform in position to sense the indicia on the goods positioned on the platform, a record-sensing mechanism interposed between the recorder and the registers for sensing the records produced by the record producing means and effecting the summating operation of the respective registers, coordinated means activated by the other register and the platform scale for releasing or restraining the issuance of the printed price summation from the one register depending upon the substantial agreement or disagreement between the scale weight and the summated weight of the selected goods on the other register, a synchronizer connected to effect the appropriate sequential operation of the sensing-mechanisms, the recorder, and the register, and means for initiating the operation of the synchronizer.

7. A machine for issuing a printed summation of one of two characteristics common to a miscellaneous selection of individually-packaged goods each having thereon indicia of the two predetermined common characteristics of the goods, the machine comprising, a platform for positioning the selected goods on the machine, an indicator actuated by the platform for directly registering the summation of one of the selected-goods' common characteristics represented by one of the indicia, registers for respectively accumulating thereon the two indexed common characteristics of the selected goods, one of the registers being adapted to issue a printed summation of its accumulations of the other goods' indexed characteristic, a sensiferous indicia record-producing means, indicia-sensing mechanism connected to the record-producing means and arranged adjacent to the platform in position to sense the indicia on the goods positioned on the platform, a record-sensing mechanism interposed between the recorder and the registers for sensing the records produced by the record-producing means and effecting the summating operation of the respective registers, mechanism for tilting and oscillating the platform to vary the disposition of the goods' indicia to the indicia-sensing mechanism, record-sorting mechanism for transmitting unduplicated records to the record-sensing mechanism, coordinated means activated by the other register and the platform indicator and connected to the one register for releasing or restraining the issuance of the printed summation from one register depending upon substantial agreement or disagreement between the platform-indicator summation of the goods' one characteristic and summation of the goods' same characteristic on the other register, a synchronizer connected to effect the appropriate sequential operation of the several sensing mechanisms, the recorder, and the registers, and means for initiating the operation of the synchronizer.

8. A machine for issuing a printed summation of the prices of a miscellaneous selection of individually-packaged goods each bearing thereon indicia of the price and weight characteristics of the respective goods, the machine comprising, a scale for positioning the selected goods on the machine and indicating the total weight of the goods, registers for respectively accumulating the price and weight characteristics of the selected goods, one of the registers being adapted to issue a printed summation of the prices of the selected goods, a price and weight sensiferous indicia recorder, indicia-sensing mechanism connected to the recorder and arranged adjacent to the scale in position to sense the indicia on the goods on the scale, a recorder record-sensing mechanism interposed between the recorder and the registers for sensing the recorder record and effecting the summating operation of the respective registers, a weight-verifying means operated by the scale and interposed between and connected to the two registers for releasing or restraining the issuance of the printed price summation from the one register depending upon the substantial agreement or disagreement between the scale weight and the summated weight of the selected goods on the other register, a synchronizer connected to effect the appropriate sequential operation of the sensing mechanisms, the recorder, and the register, and means for initiating the operation of the synchronizer.

9. A machine for issuing a printed summation of one of two characteristics common to a miscellaneous selection of individually-packaged goods each having thereon indicia of the two predetermined common characteristics of the goods, the machine comprising, a platform for positioning the selected goods on the machine, an indicator actuated by the platform for directly registering the summation of one of the selected-goods' common characteristics represented by one of the indicia, registers for respectively accumulating thereon the two indexed common characteristics of the selected goods, one of the registers being adapted to issue a printed summation of its accumulations of the other goods' indexed characteristic or an alternate statement, a sensiferous indicia recorder, indicia-sensing mechanism connected to the recorder and arranged adjacent to the platform in position to sense the indicia on the goods on the platform, a recorder record-sensing mechanism interposed between the recorder and the registers for sensing the recorder record and effecting the summating operation of the respective registers, coordinated means activated by the other register and the platform indicator for releasing either the printed summation or the alternate statement from the one register depending upon substantial agreement or disagreement between the platform-indicator summation of the goods' one characteristic and summation of the goods' same characteristic on the other register, a synchronizer connected to effect the appropriate sequential operation of the sensing mechanism, the recorder, and the registers, and means for initiating the operation of the synchronizer.

10. A customer checkout apparatus for self-service markets wherein the individually-packaged and shelved items each has affixed thereto an index representative of the price and weight characteristic of the respective items in the market, the apparatus comprising, a customer check-out station, a weight registering scale located at the station for positioning all the items selected by the customer and brought to the station, a pair of registers for respectively accumulating thereon the price and weight characteristic represented by the indicia on the items placed on the scale, one of the registers being equipped with a printing device for issuing a printed summation of its price accumulations, a price and weight indicia recorder, a sensiferous indicia-sensing mechanism connected to the recorder and arranged adjacent the scale for sensing the indicia on the items placed on the scale, a record-sensing mechanism interposed between the recorder and the registers for sensing the record produced by said recorder and effecting the summating operation of the respective registers, a weight-verifying means operated by the scale and interposed between the scale and the two registers and connected thereto for effecting the release or restraint of the printed price summation from the one register depending upon the substantial agreement or disagreement between the scale weight and the summated weight of the scale-positioned items on the other register, a synchronizer connected to effect the appropriate sequential operation of the sensing mechanism, the recorder, and the registers, and means for initiating the operation of the synchronizer.

11. A machine for effecting the check-out of patrons of self-service markets where the goods are individually packaged in various sizes and shapes and displayed for personal selection by said patrons and placement by said patrons in containers and where each packaged goods has affixed thereto a sensing-mechanism activating-indicia of a certain characteristic common to all of said packaged goods, the machine comprising, a register adapted to accumulate thereon and subsequently issue a printed summation of all said selected-goods' common characteristic, indicia-sensing mechanism, a first means for receiving a container of said selected goods in position for the indicia on said selected goods while in the container to be sensed by said sensing mechanism, a second means interposed between said sensing mechanism and said register and operatively associated therewith for translating the sensing of each of said selected-goods' indicia into mechanical motion for actuating corresponding elements of said register, and a third means for initiating the action of said sensing mechanism.

12. A machine for effecting the check-out of patrons of self-service markets where the goods are individually packaged and displayed for personal selection by said patrons and placement by said patrons in containers and where each packaged goods has affixed thereto a sensing-mechanism activating-indicia of two predetermined characteristics common to all of said packaged goods, the machine comprising, a pair of registers, one register being adapted for accumulating thereon all of one of said selected-goods' two common characteristics represented by said fixed indicia, the other register being adapted for accumulating thereon all of the other of said selected-goods' common characteristics, said one register being adapted to issue a printed summation of its accumulations of said one selected-goods' indexed characteristic, indicia sensing mechanism, a first means for receiving a container of said selected-goods in position for the indicia on said selected goods to be sensed by said sensing mechanism and to directly indicate the summation of the actual other of said selected-goods' characteristic represented by the fixed indicia, a second means interposed between said sensing mechanism and both of said registers and operatively associated therewith for translating the sensing of each of said selected-goods' indicia into mechanical motion for actuating the corresponding elements of the respective registers, coordinated means activated by the other register and said goods-receiving and indicating means for releasing or restraining the issuance of said printed summation from said one register depending upon agreement or disagreement respectively between the summation of said selected-goods' other characteristic directly indicated on said goods-receiving means and the summation of said selected-goods' other characteristic on the other register, and a third means for initiating the action of said sensing mechanism.

13. A machine for effecting the check-out of patrons of self-service markets where the goods are individually packaged and displayed for personal selection by said patrons and placement by said patrons in containers and where each packaged goods has affixed thereto a sensing-mechanism activating-indicia of two predetermined characteristics common to all of said packaged goods, the machine comprising, a pair of registers, one register being adapted for accumulating thereon all of one of said selected-goods' two common characteristics represented by said fixed indicia, the other register being adapted for accumulating thereon all of the other of said selected-goods' common characteristics, said one register being adapted to issue a printed summation of its accumulations of said one selected-goods' indexed characteristic or an alternate statement, indicia-sensing mechanism, a first means for receiving a container of said selected goods in position for the indicia on said selected goods to be sensed by said sensing mechanism and to directly indicate the summation of the actual other characteristic of the selected goods represented by the fixed indicia, a second means interposed between said sensing mechanism and both of said registers and operatively associated therewith for translating the sensing of each of said selected-goods' indicia into mechanical motion for actuating the corresponding elements of the respective registers, coordinated means activated by the other register and said goods-receiving and indicating means for releasing either the printed summation or the alternate statement from said one register depending upon agreement or disagreement respectively between the summation of said selected-goods' other characteristic directly indicated on said goods'-receiving means and the summation of said selected-goods' other characteristic on the other register, and a third means for initiating the action of said sensing mechanism.

14. A machine for effecting the check-out of patrons of self-service markets where the goods are individually packaged in various sizes and shapes and displayed for personal selection by said patrons and placement by said patrons in containers and where each packaged goods has affixed thereto a ray-influencing indicia of a certain characteristic common to all said packaged goods, the machine comprising, a register adapted to accumulate thereon and subsequently issue a printed record of all said selected-goods' common characteristic, ray-reacting mechanism, a first means for receiving a container of said selected goods in position for the indicia on said selected goods while in the container to activate said ray-reacting mechanism, a second means interposed between said ray-reacting mechanism and said register and operatively associated therewith for translating the reaction to each of said selected-goods' indicia into mechanical motion for actuating corresponding elements of said register, and a third means for initiating the action of said ray-reacting mechanism.

15. A machine for effecting the check-out of patrons of self-service markets where goods are individually packaged in various sizes and shapes and displayed for personal selection of said patrons and placement by said patrons in containers and where each packaged goods has affixed thereto a space-wave-influencing indicia of a certain characteristic common to all said packaged goods, the machine comprising, a register adapted to accumulate thereon and subsequently issue a printed record of all said selected-goods' common characteristic, space-wave-generating mechanism and space-wave reacting mechanism, a first means for receiving a container of said selected-goods' intermediate said space-wave generating mechanism and space-wave-reacting mechanism for the indicia on said selected goods while in the container to activate said space-wave reacting mechanism, a second means interposed between said space-wave reacting mechanism and said register and operatively-associated therewith for translating the reaction to each of said selected-goods' indicia into mechanical motion for actuating corresponding elements of said register, and a third means for initiating the action of said space-wave-generating and space-wave reacting mechanism.

References Cited in the file of this patent

UNITED STATES PATENTS

| | | |
|---|---|---|
| 1,186,527 | Tily | June 6, 1916 |
| 1,974,191 | Nelson et al. | Sept. 18, 1934 |
| 2,018,420 | Robinson et al. | Oct. 22, 1935 |
| 2,276,293 | Jarmer | Mar. 17, 1942 |
| 2,294,734 | Bryce | Sept. 1, 1942 |
| 2,353,002 | Armbruster | July 4, 1944 |